(12) United States Patent
Yi et al.

(10) Patent No.: US 7,978,608 B2
(45) Date of Patent: Jul. 12, 2011

(54) SYSTEM AND METHOD FOR AVOIDING STALL USING TIMER FOR HIGH-SPEED DOWNLINK PACKET ACCESS SYSTEM

(75) Inventors: Seung June Yi, Seoul (KR); Woon Young Yeo, Kyungki-Do (KR); So Young Lee, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/402,687

(22) Filed: Mar. 12, 2009

(65) Prior Publication Data

US 2009/0180411 A1  Jul. 16, 2009

Related U.S. Application Data

(63) Continuation of application No. 10/331,631, filed on Dec. 31, 2002, now Pat. No. 7,522,526.

(30) Foreign Application Priority Data

Jan. 5, 2002 (KR) .................................. 2002-00632

(51) Int. Cl.
*H04L 12/28* (2006.01)

(52) U.S. Cl. ........ 370/236; 370/328; 370/394; 709/235; 714/748

(58) Field of Classification Search .................. 370/236, 370/238, 394, 328
See application file for complete search history.

(56) References Cited

U.S. PATENT DOCUMENTS

| | | | | |
|---|---|---|---|---|
| 5,878,041 A | 3/1999 | Yamanaka et al. | ............ | 370/394 |
| 6,219,343 B1 | 4/2001 | Honkasalo et al. | ........... | 370/335 |
| 6,687,248 B2 | 2/2004 | Jiang | .............................. | 370/394 |
| 6,901,063 B2* | 5/2005 | Vayanos et al. | ................ | 370/335 |
| 7,203,196 B2 | 4/2007 | Jiang | .............................. | 370/394 |
| 7,254,143 B2 | 8/2007 | Jiang | .............................. | 370/469 |
| 7,284,179 B2 | 10/2007 | Jiang | .............................. | 714/748 |
| 7,321,589 B2* | 1/2008 | Lohr et al. | .................... | 370/394 |
| 7,436,795 B2 | 10/2008 | Jiang | .............................. | 370/328 |

(Continued)

FOREIGN PATENT DOCUMENTS

CN  1254465 A  5/2000

(Continued)

OTHER PUBLICATIONS

Ericsson, "HARQ Stall Avoidance", 3GPP TSG-RAN WG2 meeting #24, Oct. 22-26, 2001, R2-012330.*

(Continued)

*Primary Examiner* — Dang T Ton
*Assistant Examiner* — Brian O'Connor
(74) *Attorney, Agent, or Firm* — KED & Associates, LLP

(57) ABSTRACT

At least one timer is used to prevent a stall condition. If a timer is not active, the timer is started for a data block that is correctly received. The data block has a sequence number higher than a sequence number of another data block that was first expected to be received. When the timer is stopped or expires, all correctly received data blocks among data blocks up to and including a data block having a sequence number that is immediately before the sequence number of the data block for which the timer was started is delivered to a higher layer. Further, all correctly received data blocks up to a first missing data block, including the data block for which the timer was started, is delivered to the higher layer.

10 Claims, 16 Drawing Sheets

U.S. PATENT DOCUMENTS

| | | | | |
|---|---|---|---|---|
| 7,522,526 | B2 | 4/2009 | Yi et al. | 370/236 |
| 7,525,944 | B2 | 4/2009 | Vayanos et al. | 370/342 |
| 7,894,444 | B2 * | 2/2011 | Lohr et al. | 370/394 |
| 2002/0196760 | A1 | 12/2002 | Malomsoky et al. | 370/338 |
| 2003/0123403 | A1 | 7/2003 | Jiang | |
| 2006/0062223 | A1 * | 3/2006 | Manuel et al. | 370/394 |
| 2008/0212588 | A1 | 9/2008 | Yi et al. | 370/394 |

FOREIGN PATENT DOCUMENTS

| | | |
|---|---|---|
| CN | 1620768 | 5/2002 |
| EP | 1 168 704 A2 | 1/2002 |
| JP | 61-079344 | 4/1986 |
| JP | 05-122278 | 5/1993 |
| JP | 06-053921 | 2/1994 |
| JP | 07-030543 | 1/1995 |
| JP | 2001-352315 A | 12/2001 |
| JP | 2003-283596 | 10/2003 |
| KR | 10-0181152 B1 | 12/1998 |
| KR | 10-1999-0072648 | 9/1999 |
| KR | 10-1999-0077891 | 10/1999 |
| KR | 10-2002-0081954 A | 10/2002 |
| KR | 10-2002-0095125 | 12/2002 |
| KR | 10-2003-0038020 A | 5/2003 |
| RU | 97117183 A | 8/1999 |
| RU | 2142204 C1 | 11/1999 |
| WO | WO 00/57594 A1 | 9/2000 |

OTHER PUBLICATIONS

Qualcomm, "Reordering with limited TSN space", 3GPP TSP-RAN Joint WG1/WG2 meeting #23, Nov. 5-7, 2001, R2A-010028.*
TS25.308 "UTRA High Speed Downlink Packet Access", 3GPP TSG-RAN, Sep. 2001, TS 25.308 V5.0.0.*
Final Office Action dated Jan. 19, 2010 issued in U.S. Appl. No. 12/104,542.
$3^{rd}$ Generation Partnership Project; Technical Specification Group Radio Access Network; UTRA High Speed Downlink Packet Access (HSDPA); Overall Description; Stage 2 (Release 5); 3GPP TSG-RAN WG2 Meeting #25; Makuhari, Japan; Nov. 26-30, 2001; R2-012753.
3GPP Support Team; "Approved Report of the $23^{rd}$ TSG-RAN WG2 Meeting (Helsinki, Finland; Aug. 27-31, 2001)"; TSG-RAN WG2 Meeting #24; New York, NY; Oct. 22-26, 2001; pp. 1-83; R2-012211.
3GPP Support Team; "Approved Report of the $24^{th}$ TSG-RAN WG2 Meeting (New York, NY, Oct. 22-26, 2001)"; TSG-RAN WG2 Meeting #25; Makuhari, Japan; Nov. 26-20, 2001; pp. 1-47; R2-012405.
3GPP Support Team; "Approved Report of the $25^{th}$ TSG-RAN WG2 Meeting (Makuhari, Japan; Nov. 26-20, 2001)"; TSG-RAN WG2 Meeting #26; Sophia Antipolis, France; Jan. 7-11, 2002; pp. 1-73; R2-020003.
3GPP, "TS 25.308: UTRA High Speed Downlink Packet Access (HSDPA) Overall Description," Sep. 2001, Release 5.
Drafting Group; "HSDPA HARQ Protocol"; TSG-RAN Working Group 2 (Radio Layer 2 & 3RR); Helsinki, Finland; Aug. 27-31, 2001; pp. 1-4; TSGR2#23 R2-012151.
Ericsson; "Proposal for HARQ Signaling"; 3GPP TSG-RAN WG2 Meeting #24; New York, NY; Oct. 22-26, 2001; pp. 1-3; R2-012331.
Ericsson; "HARQ Stall Avoidance"; 3GPP TSG-RAN WG2; Meeting No. 26; Sophia Antipolis, France; Jan. 7-11, 2002; pp. 1-5; R2-020087.
Ericsson, "HARQ Stall Avoidance" 3GPP TSG-RAN WG2 meeting #24, Oct. 22-26, 2001, New York, USA, Agenda item 9.2.2, R2-012330, pp. 1-5.
"HARQ Stall Avoidance" 3GPP RAN TSG/WG2; No. Meeting 25, Nov. 26, 2001, pp. 1-5, XP002253923.
Lucent Technologies; "Comparison of Stall Avoidance Schemes" 3GPP TSG-RAN WG2; Meeting No. 26, Sophia Antipolis, France; Jan. 7-11, 2002; pp. 1-2; R2-020147.
Lucent Technologies; "Stall Avoidance with In-Band Signalling" 3GPP TSG-RAN WG2; Meeting No. 26; Sophia Antipolis, France; Jan. 7-11, 2002; pp. 1-4; R2-020105.
Philips; "A Pointer Approach to Avoid Stalling of the h-ARQ Protocol Due to Missing Data Blocks"; TSG-RAN Working Group 2 (Radio layer 2 and Radio layer 3); Sophia-Antipolis, France; Jan. 7-1, 2002, pp. 1-11; TSGR2#26(02)0132.
Qualcom, "Reordering with Limited TSN Space," 3GPP TSG-RAN Joint WG1/WG2 AH #32, Nov. 5-7, 2001, R2A-010028; downloaded from www://3gpp.org-/ftp/tsg_ran/WG2_RL2/TSGR2_Ahs/2001_11_WG1_HS/R2A010028.zip with post date of Nov. 5, 2001.
"Timer based mechanism for HARQ stall avoidance" 3GPP TSG-RAN WG2 meeting #26, Jan. 7-11, 2002, Sophia-Antipolis, France, Agenda item 9.2.2, Source ASUSTek, R2-020081, pp. 1-4.
"Timer based Stall Avoidance mechanism" 3GPP TSGRAN WG2 meeting #26, Jan. 7-11, 2002, Sophia-Antipolis, France, Agenda item 9.2.2, Source LG Electronics Inc., R2-020080, 4 pgs.
"Window based mechanism for HARQ stall avoidance" 3GPP RAN TSG/WG2, No. Meeting 26, Jan. 7, 2002, pp. 1-6, XP002253921.
Chinese Office Action dated Feb. 9, 2007.
Japanese Office Action dated Feb. 9, 2007.
European Search Report dated Jun. 1, 2005.
Korean Search Report dated Mar. 6, 2003.
Non Final Office Action dated Apr. 15, 2010 issued in U.S. Appl. No. 12/402,750.
Office Action dated May 17, 2010 issued in U.S. Appl. No. 12/104,542.
European Search Report dated Aug. 10, 2009.
Russian Decision to Grant a Patent dated Apr. 4, 2006.
Office Action dated Sep. 25, 2009 issued in U.S. Appl. No. 12/402,750.
U.S. Office Action dated Sep. 23, 2010 issued in U.S. Appl. No. 12/621,129.
U.S. Office Action dated Nov. 23, 2010 issued in U.S. Appl. No. 12/402,750.
U.S. Final Office Action dated Mar. 9, 2011 issued in U.S. Appl. No. 12/621,129.
U.S. Office Action dated Apr. 5, 2011 issued in U.S. Appl. No. 12/556,998.
Ericsson; "HARQ Stall Avoidance" 3GPP RAN TSG WG2; Meeting#25; Makuhari, Japan; Nov. 26-30, 2001, pp. 1-5—whole document; R2-012537 (XP-050119342).
European Search Report dated Sep. 23, 2009 for European Application No. 09 167 074.

* cited by examiner

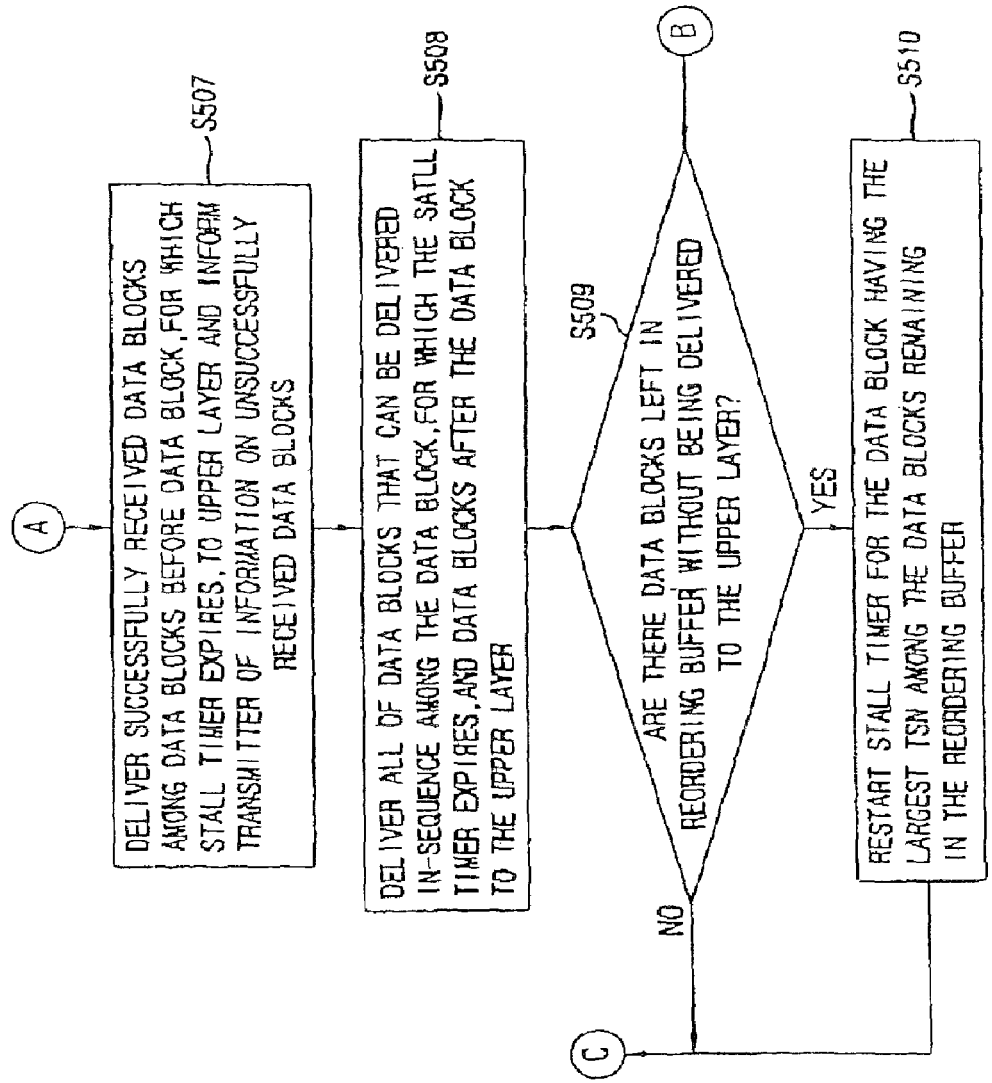

SYSTEM AND METHOD FOR AVOIDING STALL USING TIMER FOR HIGH-SPEED DOWNLINK PACKET ACCESS SYSTEM

CROSS-REFERENCE TO RELATED APPLICATIONS

This application is a Continuation Application of prior U.S. patent application Ser. No. 10/331,631 filed Dec. 31, 2002 now U.S. Pat. No. 7,522,526, which claims priority under 35 U.S.C. §119 to Korean Application No. 00632/2002 filed on Jan. 5, 2002, whose entire disclosure is hereby incorporated by reference.

BACKGROUND OF THE INVENTION

1. Field of the Invention

This invention generally relates to wireless communications, and more particularly to a system and method for improving the transmission efficiency of packet data received by a receiver in a mobile radio communications system.

2. Background of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology. In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work towards standardizing the UMTS performed by the 3GPP has resulted in the formation of five technical specification groups TSG), each of which is directed to forming network elements having independent operations. More specifically, each TSG develops, approves, and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

The TSG-RAN group includes a plenary group and four working groups. Working group 1 (WG1) develops a specification for a physical layer (a first layer). Working group 2 (WG2) specifies the functions of a data link layer (a second layer) and a network layer (a third layer). Working group 3 (WG3) defines a specification for an interface among a base station in the UTRAN, a radio network controller (RNC), and a core network. Finally, Working group 4 (WG4) discusses requirements desired for evaluation of radio link performance and items desired for radio resource management.

FIG. 1 shows a structure of a 3GPP UTRAN. This UTRAN 110 includes one or more radio network sub-systems (RNS) 120 and 130. Each RNS 120 and 130 includes a RNC 121 and 131 and one or more Nodes B 122 and 123 and 132 and 133 (e.g., a base station) managed by the RNCs. RNCs 121 and 131 are connected to a mobile switching center MSC) 141 which performs circuit switched communications with the GSM network. The RNCs are also connected to a serving general packet radio service support node (SGSN) 142 which performs packet switched communications with a general packet radio service (GPRS) network.

Nodes B are managed by the RNCs, receive information sent by the physical layer of a terminal 150 (e.g., mobile station, user equipment and/or subscriber unit) through an uplink, and transmit data to a terminal 150 through a downlink. Nodes B, thus, operate as access points of the UTRAN for terminal 150.

The RNCs perform functions which include assigning and managing radio resources. An RNC that directly manages a Node B is referred to as a control RNC (CRNC). The CRNC manages common radio resources. A serving RNC (SRNC), on the other hand, manages dedicated radio resources assigned to the respective terminals. The CRNC can be the same as the SRNC. However, when the terminal deviates from the region of the SRNC and moves to the region of another RNC, the CRNC can be different from the SRNC. Because the physical positions of various elements in the UMTS network can vary, an interface for connecting the elements is necessary. Nodes B and the RNCs are connected to each other by an Iub interface. Two RNCs are connected to each other by an Iur interface. An interface between the RNC and a core network is referred to as Iu.

FIG. 2 shows a structure of a radio access interface protocol between a terminal which operates based on a 3GPP RAN specification and a UTRAN. The radio access interface protocol is horizontally formed of a physical layer (PHY), a data link layer, and a network layer and is vertically divided into a control plane for transmitting a control information and a user plane for transmitting data information. The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2), and a third layer (L3) based on three lower layers of an open system interconnection (OSI) standard model well known in a communication system.

The first layer (L1) operates as a physical layer (PHY) for a radio interface and is connected to an upper medium access control (MAC) layer through one or more transport channels. The physical layer transmits data delivered to the physical layer (PHY) through a transport channel to a receiver using various coding and modulating methods suitable for radio circumstances. The transport channel between the physical layer (PHY) and the MAC layer is divided into a dedicated transport channel and a common transport channel based on whether it is exclusively used by a single terminal or shared by several terminals.

The second layer L2 operates as a data link layer and lets various terminals share the radio resources of a W-CDMA network. The second layer L2 is divided into the MAC layer, a radio link control (RLC) layer, a packet data convergence protocol (PDCP) layer, and a broadcast/multicast control (BMC) layer.

The MAC layer delivers data through an appropriate mapping relationship between a logical channel and a transport channel. The logical channels connect an upper layer to the MAC layer. Various logical channels are provided according to the kind of transmitted information. In general, when information of the control plane is transmitted, a control channel is used. When information of the user plane is transmitted, a traffic channel is used. The MAC layer is divided two sub-layers according to performed functions. The two sub-layers are a MAC-d sub-layer that is positioned in the SRNC and manages the dedicated transport channel and a MAC-c/sh sub-layer that is positioned in the CRNC and manages the common transport channel.

The RLC layer forms an appropriate RLC protocol data unit (PDU) suitable for transmission by the segmentation and concatenation functions of an RLC service data unit (SDU) received from an upper layer. The RLC layer also performs an automatic repeat request (ARQ) function by which an RLC PDU lost during transmission is re-transmitted. The RLC layer operates in three modes, a transparent mode (TM), an unacknowledged mode (UM), and an acknowledged mode (AM). The mode selected depends upon the method used to process the RLC SDU received from the upper layer. An RLC buffer stores the RLC SDUs or the RLC PDUs received from the upper layer exists in the RLC layer.

The packet data convergence protocol (PDCP) layer is an upper layer of the RLC layer which allows data items to be transmitted through a network protocol such as the IPv4 or the IPv6. A header compression technique for compressing and transmitting the header information in a packet can be used for effective transmission of the IP packet.

The broadcast/multicast control (BMC) layer allows a message to be transmitted from a cell broadcast center (CBC) through the radio interface. The main function of the BMC layer is scheduling and transmitting a cell broadcast message to a terminal. In general, data is transmitted through the RLC layer operating in the unacknowledged mode.

The PDCP layer and the BMC layer are connected to the SGSN because a packet switching method is used, and are located only in the user plane because they transmit only user data. Unlike the PDCP layer and the BMC layer, the RLC layer can be included in the user plane and the control plane according to a layer connected to the upper layer. When the RLC layer belongs to the control plane, data is received from a radio resource control (RRC) layer. In the other cases, the RLC layer belongs to the user plane. In general, the transmission service of user data provided from the user plane to the upper layer by the second layer (L2) is referred to as a radio bearer (RB). The transmission service of control information provided from the control plane to the upper layer by the second layer (L2) is referred to as a signaling radio bearer (SRB). As shown in FIG. 2, a plurality of entities can exist in the RLC and PDCP layers. This is because a terminal has a plurality of RBs, and one or two RLC entities and only one PDCP entity are generally used for one RB. The entities of the RLC layer and the PDCP layer can perform an independent function in each layer.

The RRC layer positioned in the lowest portion of the third layer (L3) is defined only in the control plane and controls the logical channels, the transport channels, and the physical channels in relation to the setup, the reconfiguration, and the release of the RBs. At this time, setting up the RB means processes of stipulating the characteristics of a protocol layer and a channel, which are required for providing a specific service, and setting the respective detailed parameters and operation methods. It is possible to transmit control messages received from the upper layer through a RRC message.

The aforementioned W-CDMA system attempts to achieve a transmission speed of 2 Mbps indoors and in a pico-cell circumstance, and a transmission speed of 384 kbps in a general radio condition. However, as the wireless Internet becomes more widespread and the number of subscribers increases, more diverse services will be provided. In order to support these services, it is expected that higher transmission speeds will be necessary. In the current 3GPP consortium, research is being performed to provide high transmission speeds by developing the W-CDMA network. One representative system is known as the high-speed downlink packet access (HSDPA) system.

The HSDPA system is based on WCDMA. It supports a maximum speed of 10 Mbps to the downlink and is expected to provide shorter delay time and an improved capacity than existing systems. The following technologies have been applied to the HSDPA system in order to provide higher transmission speed and enlarged capacity: link adaptation (LA), hybrid automatic repeat request (HARQ), fast cell selection (FCS), and multiple input, multiple output (MIMO) antenna.

The LA uses a modulation and coding scheme (MCS) suitable for the condition of a channel. When the channel condition is good, high degree modulation such as 16QAM or 64QAM is used. When the channel condition is bad, low degree modulation such as QPSK is used.

In general, low degree modulation methods support a lesser amount of transmission traffic than high degree modulation methods. However, in low degree modulation methods, a transmission success ratio is high when a channel condition is not desirable and therefore, it is advantageous to use this form of modulation when the influences of fading or interference is large. On the other hand, frequency efficiency is better in high degree modulation methods than in low degree modulation methods. In the high degree modulation methods, it is possible, for example, to achieve a transmission speed of 10 Mbps using the 5 MHz bandwidth of W-CDMA. However, high degree modulation methods are very sensitive to noise and interference. Therefore, when a user terminal is located close to a Node B, it is possible to improve transmission efficiency using 16QAM or 64QAM. And, when the terminal is located on the boundary of the cell or when the influence of fading is large, low modulation method such as QPSK is useful.

The HARQ method is a re-transmission method which differs from existing re-transmission methods used in the RLC layer. The HARQ method is used in connection with the physical layer, and a higher decoding success ratio is guaranteed by combining re-transmitted data with previously received data. That is, a packet that is not successfully transmitted is not discarded but stored. The stored packet is combined with a re-transmitted packet in a step before decoding and is decoded. Therefore, when the HARQ method is used together with the LA, it is possible to significantly increase the transmission efficiency of the packet.

The FCS method is similar to a related art soft handover. That is, the terminal can receive data from various cells. However, in consideration of the channel condition of each cell, the terminal receives data from a single cell which has the best channel condition. The related art soft handover methods increase the transmission success ratio using diversity, and more specifically, by receiving data from various cells. However, in the FCS method, data is received from a specific cell in order to reduce interference between cells.

Regarding the MIMO antenna system, the transmission speed of data is increased using various independent radio waves propagated in the dispersive channel condition. The MIMO antenna system usually consists of several transmission antennas and several reception antennas, so that diversity gain is obtained by reducing correlation between radio waves received by each antenna.

The HSDPA system, thus, to adopt a new technology based on a WCDMA network. However, in order to graft new technologies, modification is unavoidable. As a representative example, the function of Node B is improved. That is, though most control functions are located in the RNC in a WCDMA network, new technologies for the HSDPA system are managed by the Node B in order to achieve faster adjustment to the channel conditions and to reduce a delay time in the RNC.

The enhanced function of the Node B, however, is not meant to replace the functions of the RNC but rather is intended to supplement these functions for high speed data transmission, from a point of view of the RNC.

Thus, in an HDSPA system, the Nodes B are modified to perform some of the MAC functions unlike in the WCDMA system. A modified layer which performs some of the MAC function is referred to as a MAC-hs sub-layer.

The MAC-hs sub-layer is positioned above the physical layer and can perform packet scheduling and LA functions. The MAC-hs sub-layer also manages a new transport channel known as HS-DSCH (High Speed-Downlink Shared Channel) which is used for HSDPA data transmission. The HS-DSCH channel is used when data is exchanged between the MAC-hs sub-layer and the physical layer.

FIG. 3 shows a radio interface protocol structure for supporting the HSDPA system. As shown, the MAC layer is divided into a MAC-d sub-layer, a MAC-c/sh sub-layer, and a MAC-hs sub-layer. The MAC-hs sub-layer is positioned above the physical layer (PHY) of a Node B. The MAC-c/sh and MAC-d sub-layers are located in the CRNC and the SRNC. A new transmission protocol referred to the HS-DSCH frame protocol (FP) is used between the RNC and the Node B or among the RNCs for the delivery of HSDPA data.

The MAC-c/sh sub-layer, the MAC-d sub-layer, and the RLC layer positioned above the MAC-hs sub-layer perform the same functions as the current system. Therefore, a slight modification of the current RNC can fully support the HSDPA system.

FIG. 4 shows the structure of a MAC layer used in the HSDPA system. The MAC layer is divided into a MAC-d sub-layer 161, a MAC-c/sh sub-layer 162, and a MAC-hs sub-layer 163. The MAC-d sub layer in the SRNC manages dedicated transport channels for a specific terminal. The MAC-c/sh sub-layer in the CRNC manages the common transport channels. The MAC-hs sub-layer in the Node B manages the HS-DSCH. In this arrangement, the functions performed by the MAC-c/sh sub-layer 162 in the HSDPA system are reduced. That is, the MAC-c/sh sub-layer assigns common resources shared by various terminals in the conventional system and processes the common resources. However, in the HSDPA system, the MAC-c/sh sub-layer simply performs a flow control function of the data delivery between the MAC-d sub-layer 161 and the MAC-hs sub-layer 163.

Referring to FIG. 4, it will be described how data received from the RLC layer is processed and delivered to the HS-DSCH in the MAC layer. First, the path of the RLC PDU delivered from the RLC layer through the dedicated logical channel, (i.e. a dedicated traffic channel (DTCH) or a dedicated control channel (DCCH)), is determined by a channel switching function in the MAC-d layer. When an RLC PDU is delivered to the dedicated channel (DCH), a related header is attached to the RLC PDU in the MAC-d sub-layer 161 and the RLC PDU is delivered to the physical layer through the DCH. When the HS-DSCH channel of the HSDPA system is used, the RLC PDU is delivered to the MAC-c/s h sub-layer 162 by a channel switching function. When a plurality of logical channels use one transport channel, the RLC PDU passes through a transport channel multiplexing block. The identification information (control/traffic (C/T) field) of the logical channel, to which each RLC PDU belongs, is added during this process. Also, each logical channel has a priority. Data of a logical channel has the same priority.

The MAC-d sub-layer 161 transmits the priority of a MAC-d PDU when the MAC-d PDU is transmitted. The MAC-c/sh sub-layer 162 that received the MAC-d PDU simply passes the data received from the MAC-d sub-layer 161 to the MAC-hs sub-layer 163. The MAC-d PDU delivered to the MAC-hs sub-layer 163 is stored in the transmission buffer in the scheduling block. One transmission buffer exists per each priority level. Each MAC-hs SDU (MAC-d PDU) is sequentially stored in the transmission buffer corresponding to its priority.

An appropriate data block size is selected by the scheduling function depending on the channel condition. Accordingly, a data block is formed by one or more MAC-hs SDUs.

A priority class identifier and a transmission sequence number are added to each data block and each data block is delivered to the HARQ block.

A maximum 8 HARQ processes exist in the HARQ block. The data block received from the scheduling block is delivered to an appropriate HARQ process. Each HARQ process operates in a stop and wait (SAW) ARQ. In this method, the next data block is not transmitted until a current data block is successfully transmitted. As mentioned above, because only one data block is transmitted in a TTI, only one HARQ process is activated in one TTI.

Another HARQ processes waits until its turn. Each HARQ process has a HARQ process identifier. A corresponding HARQ process identifier is previously known to the terminal through a downlink control signal, so that a specific data block passes through the same HARQ process in the transmitter (the UTRAN) and the receiver (the terminal). The HARQ process that transmitted the data block also stores the data block to provision the future re-transmission. The HARQ process, re-transmits the data block when NonAC-Knowledge (NACK) is received from the terminal.

When ACK is received from the terminal, the HARQ process deletes the corresponding data block and prepares the transmission of a new data block. When the data block is transmitted, a transport format and resource combination (TFRC) block selects an appropriate TFC for the HS-DSCH.

FIG. 5 shows a structure of the MAC layer of the terminal used in the HSDPA system. This MAC layer is divided into a MAC-d sub-layer 173, a MAC-c/sh sub-layer 172, and a MAC-hs sub-layer 171. Unlike the UTRAN, the above three layers are located in the same place. The MAC-d sub-layer and the MAC-c/sh sub-layer in the terminal are almost same as those in the UTRAN, but the MAC-hs sub-layer 171 is slightly different because the MAC-hs sub-layer in the UTRAN performs only transmission and the MAC-hs sub-layer in the terminal performs only reception.

The manner in which the MAC layer receives the data from the physical layer and delivers it to the RLC layer will now be described. The data block delivered to the MAC-hs sub-layer 171 through the HS-DSCH is first stored in one of the HARQ processes in the HARQ block. In which process the data block is stored can be known from the HARQ process identifier included in the downlink control signal.

The HARQ process, in which the data block is stored, transmits the NACK information to the UTRAN when there are errors in the data block and requests the re-transmission of the data block. When no errors exist, the HARQ process delivers the data block to a reordering buffer and transmits the ACK information to the UTRAN. A reordering buffer has a priority like the transmission buffer in the UTRAN. The HARQ process delivers the data block to the corresponding reordering buffer with the aid of a priority class identifier included in the data block. A significant characteristic of the reordering buffer is that it supports in-sequence delivery of data.

Data blocks are sequentially delivered to an upper layer based on a transmission sequence number (TSN). More specifically, when a data block is received while one or more previous data blocks are missing, the data block is stored in the reordering buffer and is not delivered to the upper layer. Rather, the stored data block is delivered to the upper layer only when all previous data blocks are received and delivered to the upper layer. Because several HARQ processes operate, a reordering buffer may receive data blocks out of sequence. Therefore, an in-sequence delivery function is used for the reordering buffer so that the data blocks can be delivered to the upper layer sequentially.

One difference between the reordering buffer of the terminal and the transmission buffer of the UTRAN is that the reordering buffer stores data in units of data block which is composed of one or more MAC-hs SDUs, while the transmission buffer stores data in units of MAC-hs SDU (=MAC-d PDU). Because the MAC-d sub-layer 173 processes data in units of MAC-d PDUs, when the reordering buffer of the terminal MAC-hs sub-layer 171 delivers the data block to the MAC-d sub-layer 173, the reordering buffer must first disassemble the data block into the MAC-d PDUs and then deliver them to the MAC-d sub-layer. The MAC-c/sh sub-layer 172 passes the MAC-d PDUs received from the MAC-hs sub-layer 171 to the MAC-d sub-layer. The MAC-d sub-layer 173 that received the MAC-d PDU checks the logical channel identifier (C/T field) included in each MAC-d PDU in the transport channel multiplexing block and delivers the MAC-d PDUs to the RLC through the corresponding logical channel.

FIG. 6 shows processes for transmitting and receiving a data block in an HSDPA system. The MAC-d PDUs are actually stored in a transmission buffer 180. However, for the sake of convenience, it is shown as a data block (=one or more MAC-d PDUs). The sizes of the respective data blocks can vary. However, the sizes are shown to be the same because the data blocks for illustrative purposes. Also, it is assumed that eight HARQ processes 181 through 188 exist.

The process includes transmitting data blocks to the receiver for data blocks having transmission sequence numbers from TSN=13 to TSN=22 in the transmission buffer. A data block with a lower TSN is served first to an empty HARQ process. For example, as shown, the data block TSN=13 is delivered to HARQ process #1 181, and data block TSN=14 is delivered to HARQ process #8. From this explanation, it is clear that the TSN is not related to the HARQ process number.

When the HARQ process receives an arbitrary data block, the HARQ process transmits the data block to the receiver in a specific TTI and stores the data block for re-transmission that might be performed later. Only one data block can be transmitted in a certain TTI. Accordingly, only one HARQ process is activated in a single TTI. The HARQ process that transmitted the data block informs the receiver of its process number through a downlink control signal which is transmitted through a different channel than that of the data block.

The reason why the HARQ process of the transmitter coincides with the HARQ process of the receiver is that a stop-and-wait ARQ method is used by each HARQ process pair. That is, HARQ process #1 181 that transmitted data block TSN=13 does not transmit another data block until the data block is successfully transmitted. Because a receiver HARQ process #1 191 can know that data is transmitted thereto for a corresponding TTI through the downlink control signal, the receiver HARQ process #1 transmits the NACK information to the transmitter through an uplink control signal when the data block is not successfully received within a defined transmission time interval (TTI). On the other hand, when a data block is successfully received, the receiver HARQ process #1 transmits the ACK information to the transmitter, and at the same time delivers the corresponding data block to the reordering buffer according to the priority.

The reordering buffer exists per priority level. The HARQ process checks the priority included in the header information of the data block and delivers the data block to the reordering buffer according to the priority. The data block delivered to the reordering buffer is then delivered to the upper layer when all of the previous data blocks are delivered to the upper layer. However, when one or more previous data blocks are not delivered to the upper layer, the data block is stored in the reordering buffer 190. That is, the reordering buffer must support in-sequence delivery of data blocks to the upper layer. A data block that is not delivered to the upper layer is stored in the reordering buffer.

To illustrate the foregoing, FIG. 6 shows that when data block TSN=14 is received but data block TSN=13 is not received, data block TSN=14 is stored in the reordering buffer until data block TSN=13 is received. When data block TSN=13 is received, both data blocks are delivered to the upper layer in the order of TSN=13 and TSN=14. When the data blocks are delivered to the upper layer, they are disassembled in units of MAC-d PDUs and are delivered as described above.

The reordering buffer delivery process is susceptible to a stall condition which may be described as follows. Because the reordering buffer supports in-sequence delivery of data blocks, when a specific data block is not received data blocks having later TSNs are not delivered to the upper layer but rather are stored in the reordering buffer. When a specific data block is not received for a long time or permanently, the data blocks in the reordering buffer are not delivered to the upper layer. Moreover, after a short period of time, additional data blocks cannot be received because the buffer becomes full, thereby resulting in a stall situation.

When stall occurs and a specific data block cannot be delivered for a long time or ever, the transmission efficiency of the HSDPA system deteriorates. More specifically, when a large number of data blocks are stored in the buffer of the MAC-hs for a long time due to a single missing data block, the entire data transmission efficiency of the system is reduced. This undermines many of the advantages of the HSDPA system, such as its ability to provide high-speed data communications.

In an attempt to overcome this problem, related methods take the following approach. When the receiver does not successfully receive a data block for a certain amount of time, the receiver stops waiting for the missing data block and delivers subsequently received data blocks to the upper layer. As a result, all the data blocks that were successfully received and stored in the reordering buffer are lost and consequently quality of communications and transmission efficiency is diminished.

Incidentally, it is noted that a data block may not be received permanently because of one of the following two reasons:

1) The UTRAN misinterprets the NACK signal sent by the terminal as an ACK signal; and 2) The HARQ process of the UTRAN discards the corresponding data block because the data block has been re-transmitted a maximum number of times allowable by the system or the transmission is not successfully performed for a defined time.

In case 1), the UTRAN wrongly decodes status information sent by the terminal. In case 2), the UTRAN discards the specific data block because the transmission of the specific data block has not been successful for a long time. The UTRAN, however, does not inform the terminal of this fact.

In this case, because the corresponding data block is not transmitted permanently, later data blocks are stored in the reordering buffer without being delivered to the upper layer. Therefore, a protocol is stalled, which is a big problem.

A need therefore exists for an improved method of increasing the efficiency and quality of voice and data transmissions in a mobile communications system, and more specifically one which is able to achieve these advantages while simultaneously correcting a stall condition in a reordering buffer of a communications receiver.

SUMMARY OF THE INVENTION

It is one object of the present invention to provide a system and method for improving the quality of communications in a mobile communications system.

It is another object of the present invention to achieve the aforementioned object by preventing a stall condition in a user terminal in a way that simultaneously improves the transmission efficiency of the system.

It is another object of the present invention to achieve the aforementioned object using a stall timer which limits the amount of time data blocks are stored in a reordering buffer of the receiver.

It is another object of the present invention to set a period of the stall timer to a value which prevents a wrap-around condition from occurring with respect to transmission sequence numbers assigned to data blocks stored in the buffer.

It is another object of the present invention to provide a system and method which prevents a stall condition in a reordering buffer and simultaneously prevents correctly received data blocks stored in the buffer from being lost.

These and other objects and advantages of the present invention are achieved by providing a method which prevents a stall condition in a user terminal by receiving a data block SN, detecting that a data block having a transmission sequence number which precedes a transmission sequence number of data block SN has not been received, storing data block SN in a reordering buffer, and outputting data block SN from the buffer when a first period of a timer expires. The user terminal may be configured to operate, for example, within a high-speed downlink packet-access (HSDPA) mobile communications system, and the reordering buffer is preferably implemented in a MAC layer of the terminal. If implemented in this manner, the buffer may receive data blocks from a physical layer via a HS-DSCH channel and may output data blocks to an upper layer such as an RLC layer.

Additional steps of the method include receiving the preceding data block during the first timer period and then delivering the preceding data block and data block SN to the upper layer. The preceding data block may be delivered in one of a variety of ways. In accordance with one embodiment, the preceding data block and data block SN may be delivered to the intended destination when the first timer period expires. Advantageously, this step may be performed even if at least one other data block having a preceding transmission sequence number has not been received.

In accordance with another embodiment, if the preceding data block is received before the first timer period expires and the preceding data block is the only missing data block preceding data block SN, the preceding data block and data block SN are delivered to the intended destination and the timer is stopped.

In accordance with another embodiment, a plurality of data blocks having preceding transmission sequence numbers are detected to be missing at a time when data block SN is received. In this case, when at least one of the preceding data blocks is received before the first timer period expires, the received preceding data block is immediately delivered to the intended destination if it has not anticipated missing data blocks preceding it. Otherwise, the received preceding data block is delivered with data block SN after the first timer period expires.

In accordance with another embodiment, a data block having a succeeding transmission sequence number is received during the first timer period. Data block SN and the succeeding data block are then delivered to an intended destination when the first timer period expires, but only if the succeeding data block and data block SN have consecutive transmission sequence numbers.

In accordance with another embodiment, a data block having a succeeding transmission sequence number is received during the first timer period. When this occurs, the preceding data block and data block SN are delivered to an intended destination when the first timer period expires, and the succeeding data block is also delivered when the first timer period expires but only if data block SN and the succeeding data block have consecutive transmission sequence numbers.

In accordance with another embodiment, a plurality of data blocks having succeeding transmission sequence numbers are received during the first timer period. When this occurs, the plurality of succeeding data blocks are delivered with data block SN to an intended destination when the first timer period expires but only if data block SN and the plurality of succeeding data blocks have consecutive transmission sequence numbers.

In accordance with another embodiment, a plurality of data blocks having succeeding transmission sequence numbers are received, and it is detected that there is at least one missing data block M in the plurality of succeeding data blocks. Data block SN and one or more of the succeeding blocks may have consecutive transmission sequence numbers, and missing data block M may have a transmission sequence number which comes after the transmission sequence numbers of the one or more succeeding data blocks that consecutively follow the transmission sequence number of data block SN. When this occurs, the one or more data blocks having transmission sequence numbers that consecutively follow the transmission sequence number of data block SN are delivered to an intended destination when the first timer period expires. The delivered data blocks are then discarded from the buffer and the remaining succeeding data blocks (i.e., ones having transmission sequence numbers that come after the transmission sequence number of data block M) are stored in the buffer.

In accordance with another embodiment, a second period of the timer may be started based on the remaining succeeding block having a highest transmission sequence number. When this occurs, each of the remaining succeeding data blocks is delivered to an intended destination after all the anticipated missing data blocks preceding it are received or after the second timer period expires.

The present invention is also a computer program having respective code sections which perform steps included in any of the embodiments of the method of the present invention discussed herein. The computer program may be written in any computer language supportable within a user terminal, and may be stored on a permanent or removable computer-readable medium within or interfaced to the terminal.

The present invention is also a method for controlling a reordering buffer. The buffer is preferably located within a communications receiver, but may also be implemented in other portions of a communications system if desired. The method includes providing a timer which controls storage of data blocks in the buffer, and setting a period of the timer to a value which prevents a wrap-around of transmission serial numbers assigned to the data blocks from occurring.

In accordance with another embodiment, a method for processing packet data in a receiver of a communications system receives a data block having a sequence number, stores the data block in a reordering buffer, and starts a timer for the reordering buffer if a data block of a preceding sequence number is missing. Here, the timer is the only timer provided for controlling the reordering buffer. Preferably, the timer is started only when the data block of the preceding sequence number is missing and the timer is not active.

Additional steps of the method include determining whether the data block can be immediately delivered to an upper layer. If yes, the data block is delivered to the upper layer without ever storing it in the reordering buffer. If not, the data block is stored in the reordering buffer. Also, the step of determining whether the time is active may be performed before the starting step. If the timer is active the starting step may not be performed.

Additional steps include receiving at least one additional data block after the timer has been started and storing the at least one additional data block in the reordering buffer. The additional data block may have a preceding sequence number. In this case, the additional block may be removed from the buffer and delivered to an upper layer when there is no anticipated missing data block preceding it or when the timer expires. The additional data block may have a succeeding sequence number. In this case, the additional block may be removed from the reordering buffer and delivered to an upper layer when the timer expires if the succeeding sequence number of the additional data block consecutively follows the data block having said sequence number. If the sequence number of the additional block does not consecutively follow, then the additional block may continue to be stored in the buffer after the timer expires. The timer may then be re-started for the data block stored in the buffer having the highest sequence number in the buffer.

In accordance with another embodiment, a method for processing packet data in a receiver of a communications system includes starting a timer for a reordering buffer, receiving a data block having a sequence number, storing the data block in the reordering buffer, and removing the data block from the reordering buffer when the timer expires if the sequence number of the data block precedes a sequence number of a data block received and stored in the reordering buffer at a time when the timer was started.

In accordance with another embodiment, the present invention provides a user terminal which includes a reordering buffer for storing a data block having a sequence number, a timer, and a controller which starts said timer for the reordering buffer if a data block of a preceding sequence number is missing, wherein said timer is the only timer provided for controlling the reordering buffer. The controller starts said timer if the data block of said preceding sequence number is missing and the timer is not active. The controller may also determine whether the data block of said preceding sequence number can be immediately delivered to an upper layer. The buffer will store the data block of said preceding sequence number in the reordering buffer if the data block cannot immediately be delivered to the upper layer. If the data block can be immediately delivered, the buffer outputs the block to an upper layer.

The reordering buffer also stores at least one additional data block in the reordering buffer at the timer has started. The additional data block may be the missing data block having said preceding sequence number. If so, the additional block is removed from the reordering buffer and delivered to the upper layer when the timer expires. The additional block may also be a succeeding sequence number. If so, the data block is removed from the reordering buffer and delivered to an upper layer when the timer expires if its succeeding sequence number consecutively follows the data block having said sequence number.

The reordering buffer will continue to store the additional data block in the reordering buffer after the timer expires if the succeeding sequence number of the additional data block does not consecutively follow the data block having said sequence number. In this case, the controller will determine a data block stored in the buffer having a highest sequence number and will then re-start the timer.

In accordance with another embodiment, a method for processing packet data in a receiver of a communications system includes receiving data blocks, storing the data blocks in a reordering buffer, starting a timer for the reordering buffer, and delivering the data blocks from the reordering buffer to an upper layer when the timer expires. In this embodiment, in the delivering step the data blocks are delivered sequentially but may not in-sequence manner. The difference of sequential delivery from the in-sequence delivery is that in this case the sequence numbers of two adjacently delivered data blocks can be not consecutive. That is, a missing data block is allowed between the delivered data blocks. For example, delivered data blocks have following sequence numbers 14, 15, 17, 19, 24, 25, 26, 28, . . . . Missing data block is allowed, but should be delivered sequentially. If we apply the in-sequence delivery to the above example, the data blocks of sequence number higher than 16 should not be delivered until the data block 16 is delivered. The sequence number of the delivered data blocks must be: 14, 15, 16, 17, 18, 19, . . . Missing data block is not allowed, and should be delivered sequentially. On the contrary, a reordering buffer may receive data blocks out of sequence. In this case, the out-of-sequence reception means a reordering buffer may receive data blocks with upper TSN earlier than data blocks with lower TSN. For example, a reordering buffer receives data blocks like this: 15, 20, 14, 16, 23, 24, 17, 18, . . .

The present invention represents a significant improvement over conventional methods of preventing a stall condition in a communication system. By delivering correctly received data blocks that would otherwise be lost in a conventional system, the invention improves transmission efficiency and the quality of communications at the receiver. The invention also removes the cumulative delay problem that tends to arise in a receiver as a result of a TSN wrap-around condition. Through these improvements, the invention will allow user terminals to meet or exceed the performance standards required by so-called next-generation wireless systems.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 10A and 10B show another embodiment of the method of the present invention for avoiding a stall condition in an HSDPA system.

DETAILED DESCRIPTION OF PREFERRED EMBODIMENTS

The present invention is a system and method for preventing a stall condition in a user terminal of a mobile communications system. The invention is preferably implemented in a mobile network such as the Universal Mobile Telecommunications System (UMTS) currently being developed by the third-generation partnership project (3GPP). Those skilled in the art can appreciate, however, that the invention may alternatively be adapted for use in communications systems which operate according to other standards. The present invention is also a user terminal which implements the method of the present invention for preventing a stall condition from occurring. The present invention is also a computer program which may be stored in the user terminal for implementing the method of the present invention. A detailed discussion of embodiments of the invention will now be provided.

The invention is ideally suited for use in a high-speed downlink packet-access (HSDPA) mobile system. Systems of this type include user equipment which communicates with a UMTS Terrestrial Radio Access Network (UTRAN) through a wireless link. The user equipment may include, for example, a mobile telephone, a personal digital assistant, a so-called pocket PC, a laptop or notebook computer, or any other device which receives signals wirelessly transmitted over a mobile communications network. As previously discussed, these signals may be transmitted by a UTRAN and received by a user terminal operating in accordance with the protocol architecture shown, for example, in FIGS. 1-3, 5, and 6.

When implemented in this manner, the method of the present invention controls the storage of data blocks within and the subsequent transfer and deletion of data blocks from a reordering buffer operating within the medium access control (MAC) layer of the user terminal. More specifically, the reordering buffer may be located in a MAC-hs sub-layer, which receives data blocks from a lower-level physical layer and transfers those blocks to an upper layer such as the radio link control (RLC) layer through MAC-c/sh and MAC-d sub-layers respectively. These features were previously discussed at length with reference to, for example, FIG. 5 and therefore a detailed discussion of them will not be provided here.

Figure 1:
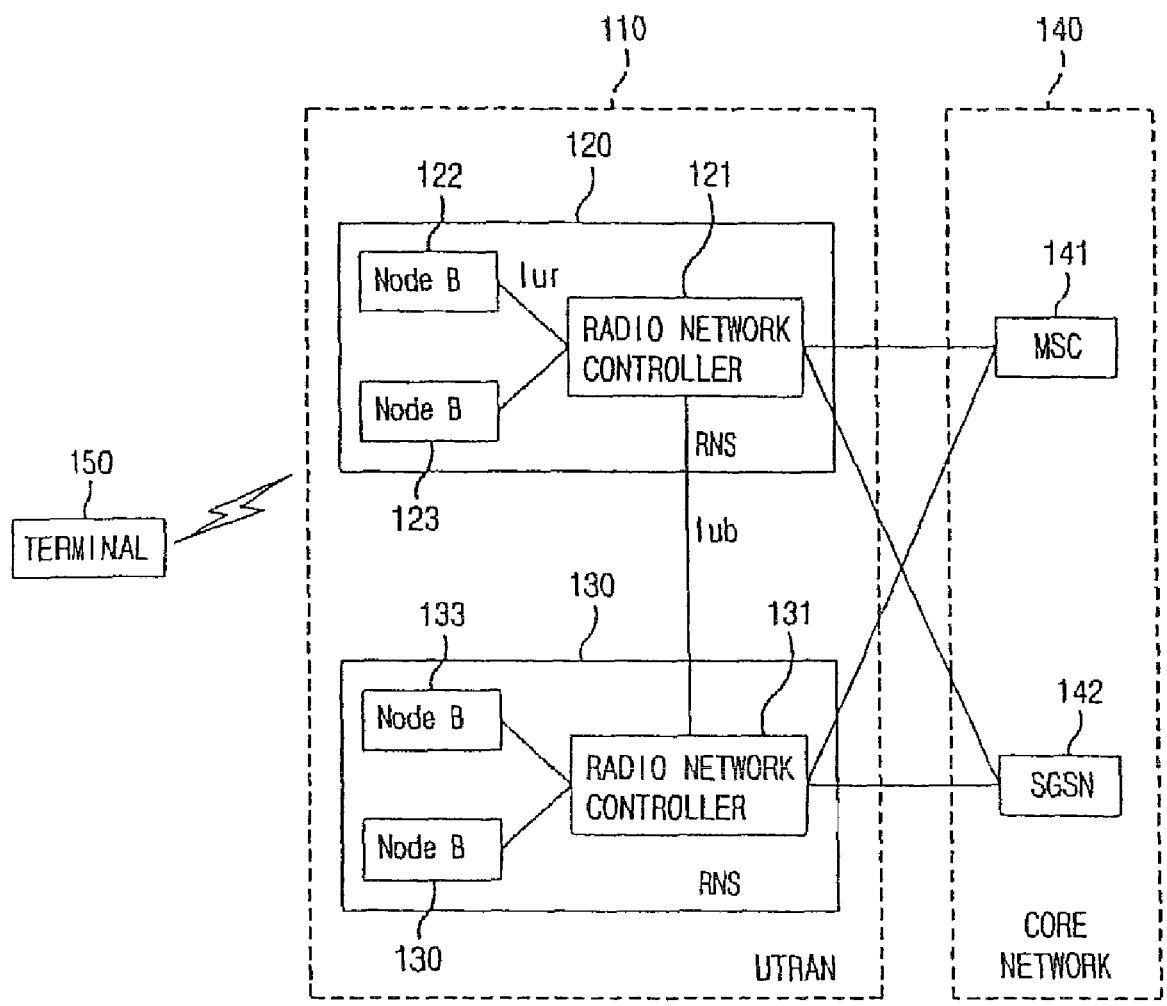
FIG. 1 shows a structure of a 3GPP UTRAN in a 3GPP communications system.
Figure 2:
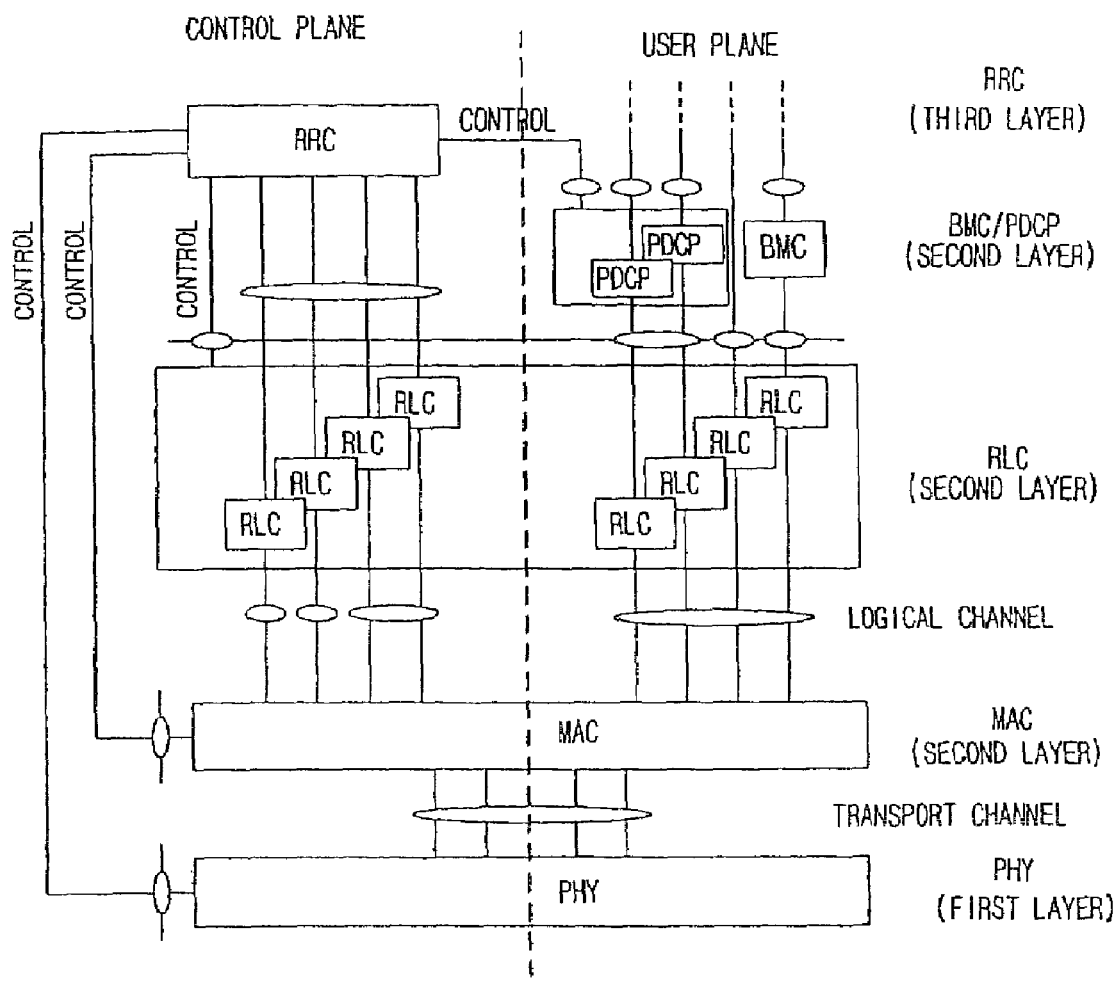
FIG. 2 shows a structure of a radio access interface protocol between a terminal which operates based on a 3GPP RAN specification and a UTRAN.
Figure 3:
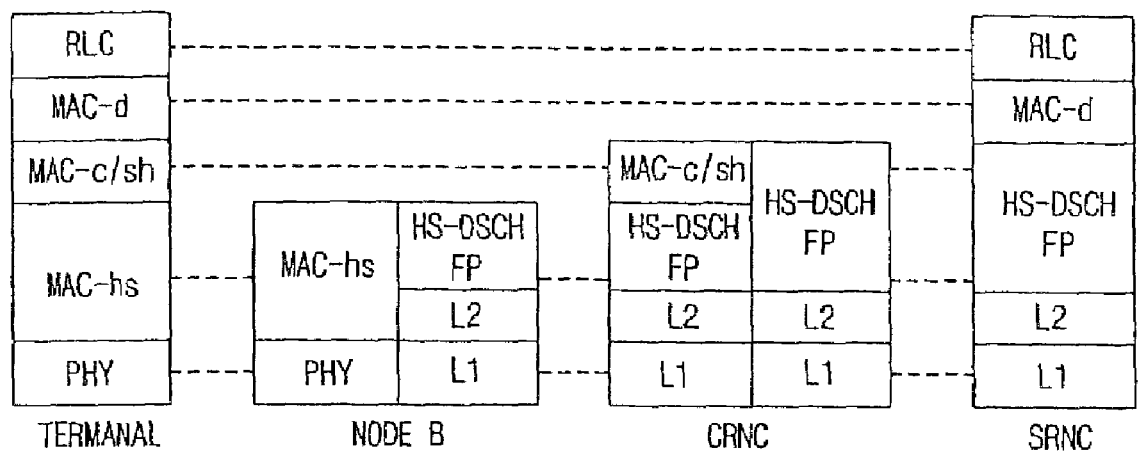
FIG. 3 shows a radio interface protocol structure for supporting the HSDPA system.
Figure 4:
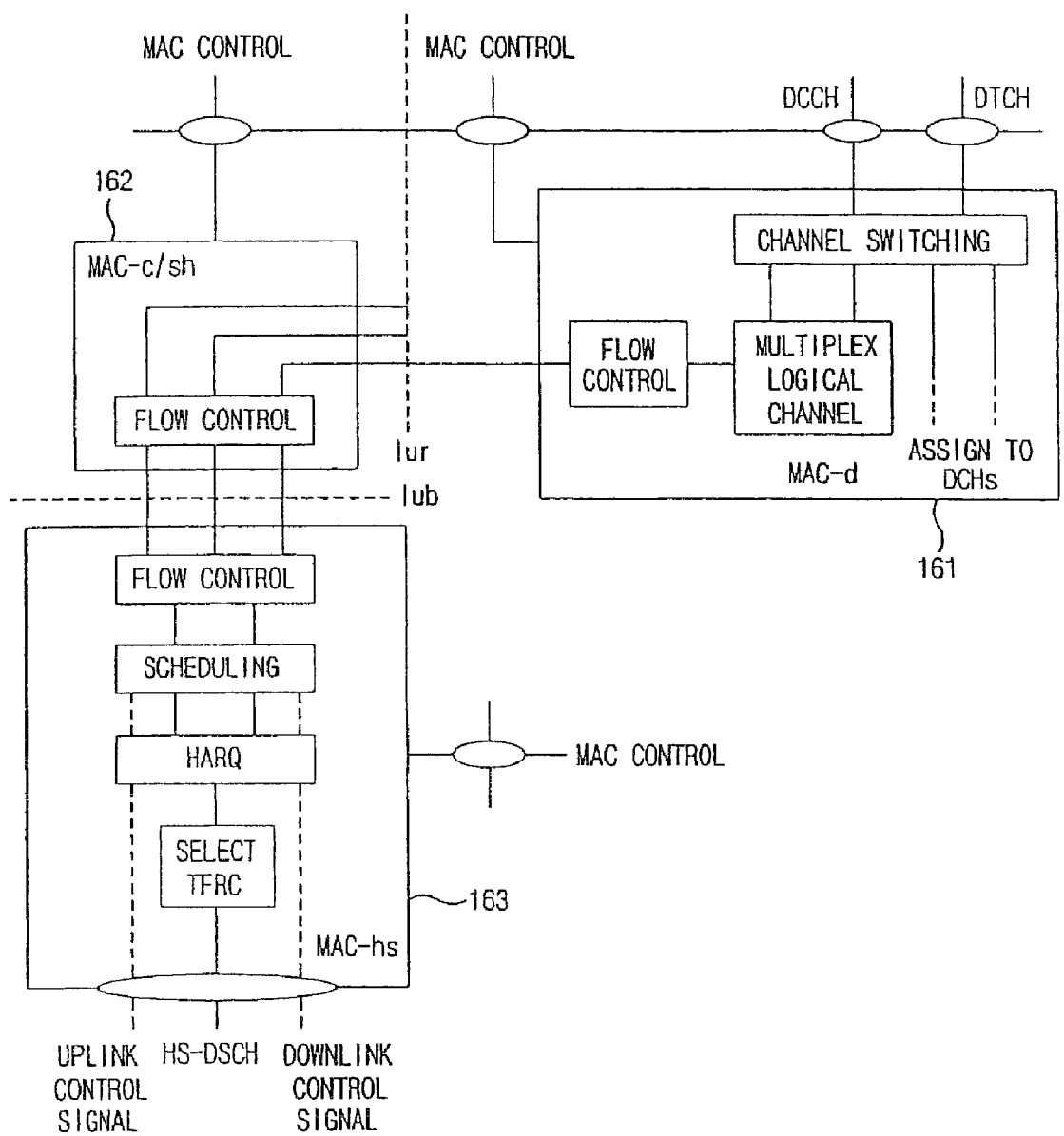
FIG. 4 shows the structure of a MAC layer used in the HSDPA system, which layer includes a MAC-d sub-layer, a MAC-c/sh sub-layer, and a MAC-hs sub-layer.
Figure 5:
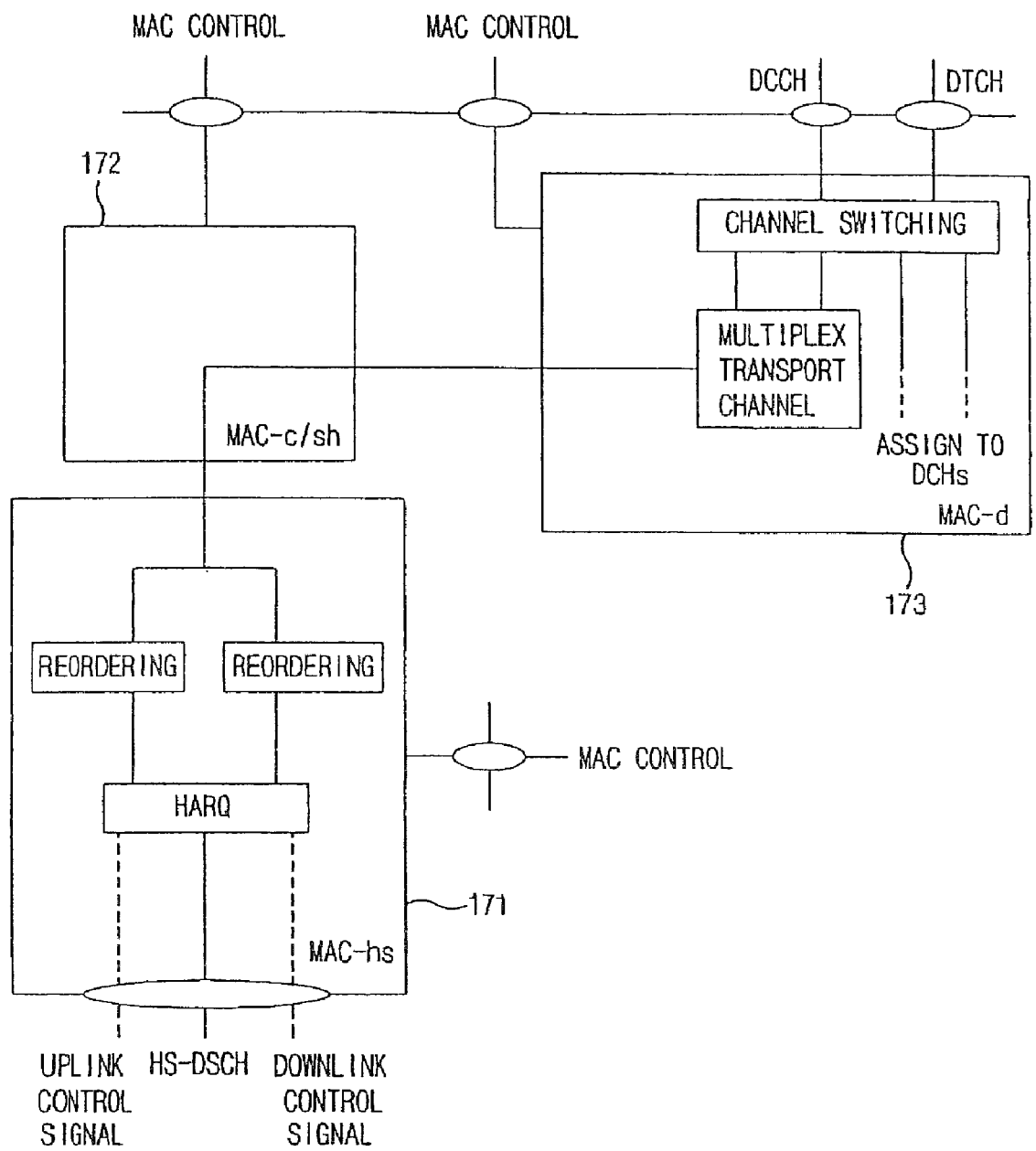
FIG. 5 shows a structure of the MAC layer of a user terminal in an HSDPA system.
Figure 6:
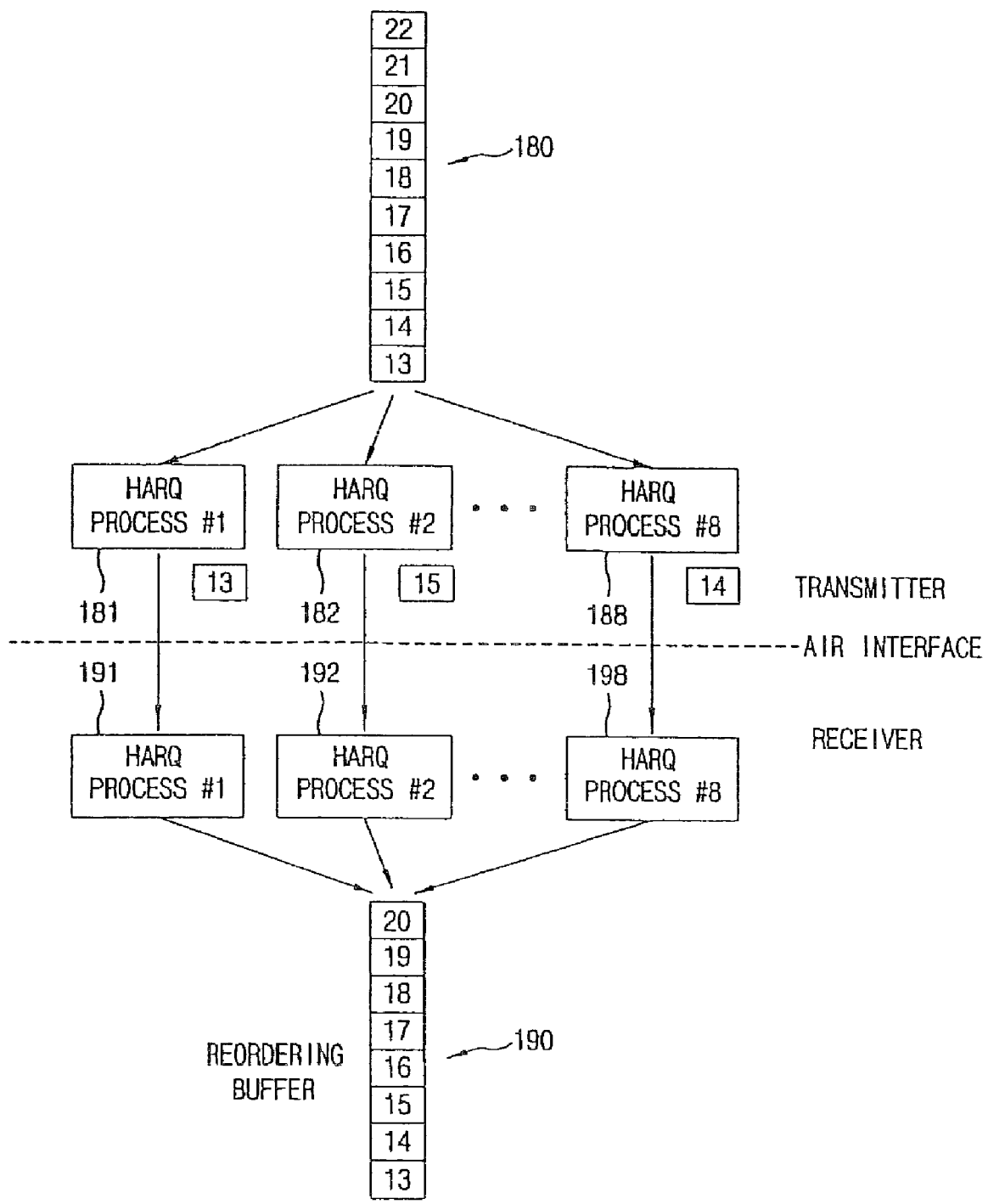
FIG. 6 shows a process for transmitting and receiving a data block in an HSDPA system.
Figure 7:
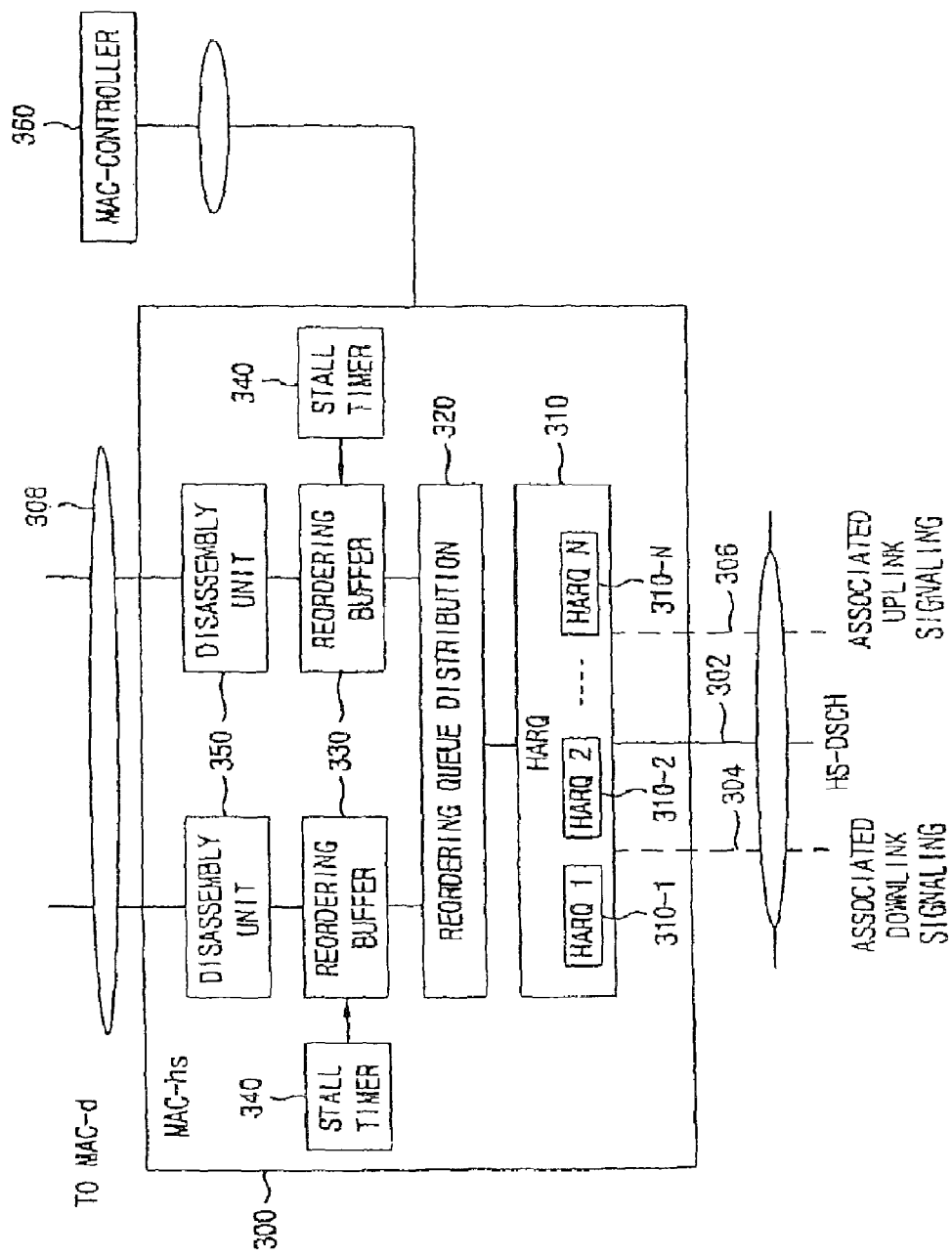
FIG. 7 shows a user terminal in accordance with a preferred embodiment of the invention.

FIG. 7 is a diagram showing a user terminal in accordance with a preferred embodiment of the invention. The terminal includes circuits/software for performing the method which will be described in greater detail below. At this point, it is sufficient to note that these circuits/software are preferably incorporated within a MAC-hs entity 300, which receives data blocks from a peer entity of a UTRAN through a plurality of high-speed downlink shared channels (HS-DSCHs) 302 and delivers those data blocks to a MAC-d sub-layer by way of a MAC-c/sh sub-layer through a series of dedicated transport channels (DCHs) 308. The MAC-hs entity and the peer entity of UTRAN exchange messages and other control forms of control information through downlink and uplink channels 304 and 306 respectively.

The MAC-hs entity includes a HARQ unit 310, a reordering queue distribution unit 320, one or more reordering buffers 330 preferably with an equal number of stall timers 340, a plurality of disassembly units 350, and an input for receiving control signals from a MAC layer controller 360 for managing the functions and operations performed in the MAC-hs entity.

The HARQ unit performs MAC functions relating to the HARQ protocol which include but are not limited to all tasks required for hybrid ARQ. The HARQ unit also transmits acknowledgment (ACK) and non-acknowledgment (NACK) signals indicating whether data blocks transmitted by the peer entity of the UTRAN have been received. The HARQ unit includes a plurality of HARQ processes 310-1 to 310-$n$ which preferably operate in parallel. The number of HARQ processes may be determined by one or more of the upper layers of the protocol. In operation, each HARQ process transfer data blocks from an HS-DSCH channel to a reordering buffer based on priority class identification information in headers of the blocks. The data blocks include or may be in the form of MAC-hs protocol data units (PDUs) or service data units (SDUs).

The reordering queue distribution unit routes the data blocks to the correct reordering buffer based on queue identification (ID) information in the header of each block. This information provides, for example, an indication of the reordering queue that may be used to support independent buffer handling of data belonging to different reordering queues.

The reordering buffers reorder data blocks from the reordering queue distribution unit based on transmission sequence numbers (TSNs) in headers of the blocks. The buffers then deliver those blocks in sequence to an upper layer. Delivery of the blocks may be performed as follows. In each buffer, data blocks with consecutive TSNs are delivered to an associated disassembly unit upon reception. A data block, however, is not immediately delivered to a disassembly function if one or more preceding data blocks (e.g., ones having lower transmission sequence numbers) were not received. In this case, the data blocks are temporarily stored in the reordering buffer and then output under control of the stall timer of the present invention, discussed in greater detail below. One reordering buffer may be provided for each queue ID, and each transmission sequence number may be provided with respect to a specific reordering buffer. TSN and queue ID information may be inserted into the headers of each data block by a scheduler and HARQ process entity located in the UTRAN.

The disassembly units disassemble data blocks output from the reordering buffers respectively. If the data blocks include MAC-hs PDUs, they are disassembled by removing header information, extracting MAC-d PDUs, and removing any padding bits that may be present. The MAC-d PDUs are then delivered to an upper layer.

The stall timers control when data blocks are output from the reordering buffers. Preferably, one stall timer is provided for each reordering buffer. As those skilled in the art can appreciate, multiple timers may be used but one is sufficient. The stall timer for each buffer is initially activated when a data block cannot immediately be delivered to an upper layer. This occurs when one or more preceding data blocks (e.g., ones having lower transmission sequence numbers) were not received. The following rule therefore governs when a data block is stored in the buffer and when a stall timer is initially activated: data blocks may be delivered to an upper layer only when all previous data blocks are received and delivered.

When the aforementioned rule is initially violated, a received data block is temporarily stored in the buffer for a period of time determined by the stall timer. Depending on the embodiment of the invention, this period of time may equal one or more stall timer periods. The stall timer period is preferably set by upper layers of the protocol. This period is preferably set to ensure that a transmission sequence number wrap-around condition does not occur. The manner in which the stall timer is set is discussed in greater detail below.

Figure 8A:
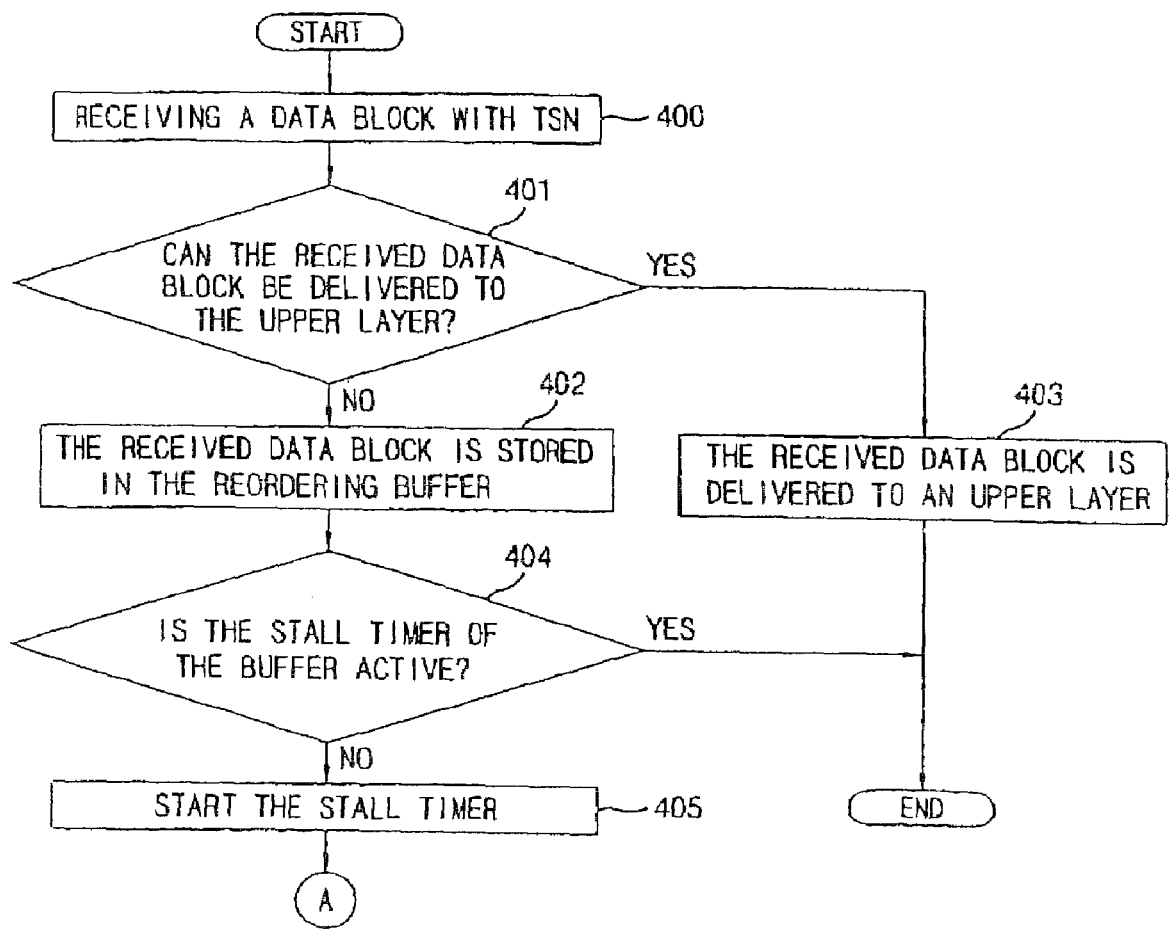
FIGS. 8A-8C show steps included in a method for avoiding a stall condition in a reordering buffer in accordance with one embodiment of the present invention.
Figure 8B:
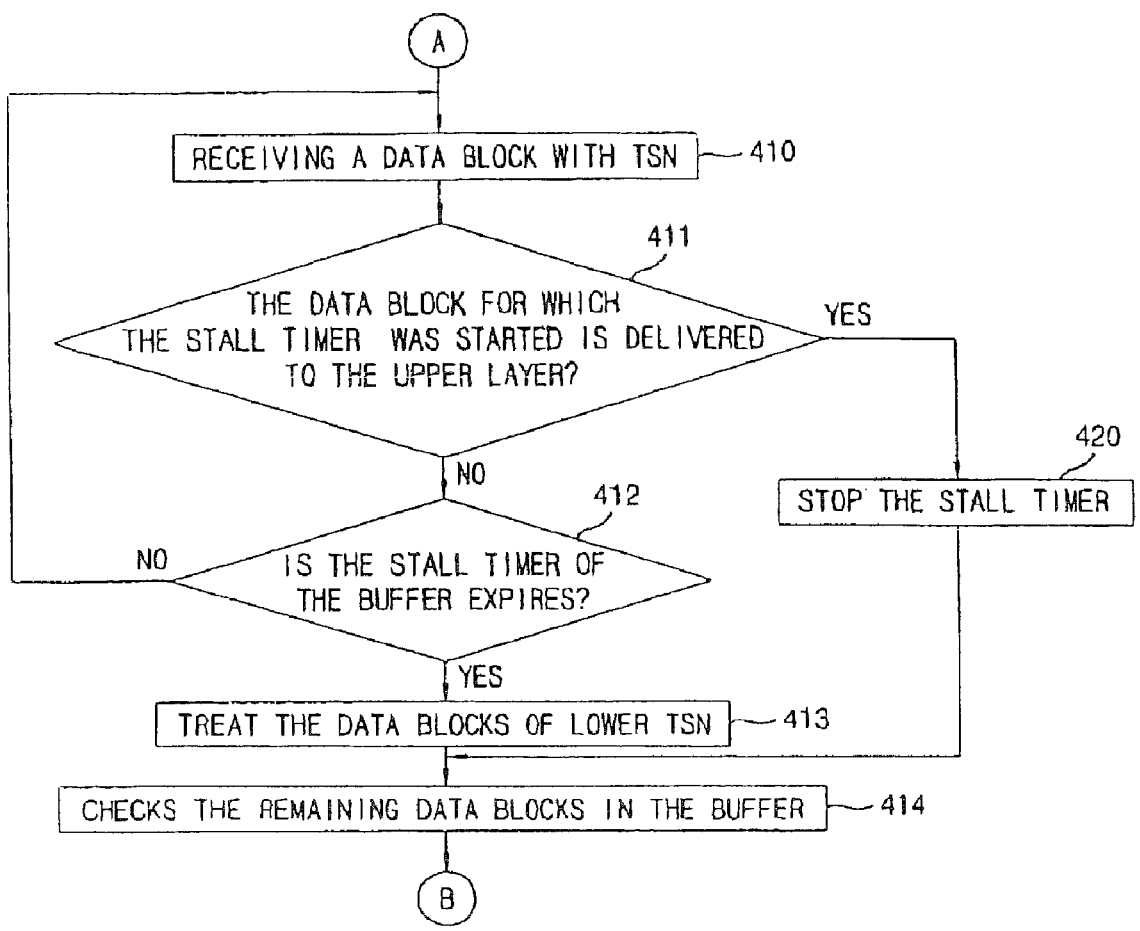
Figure 8C:
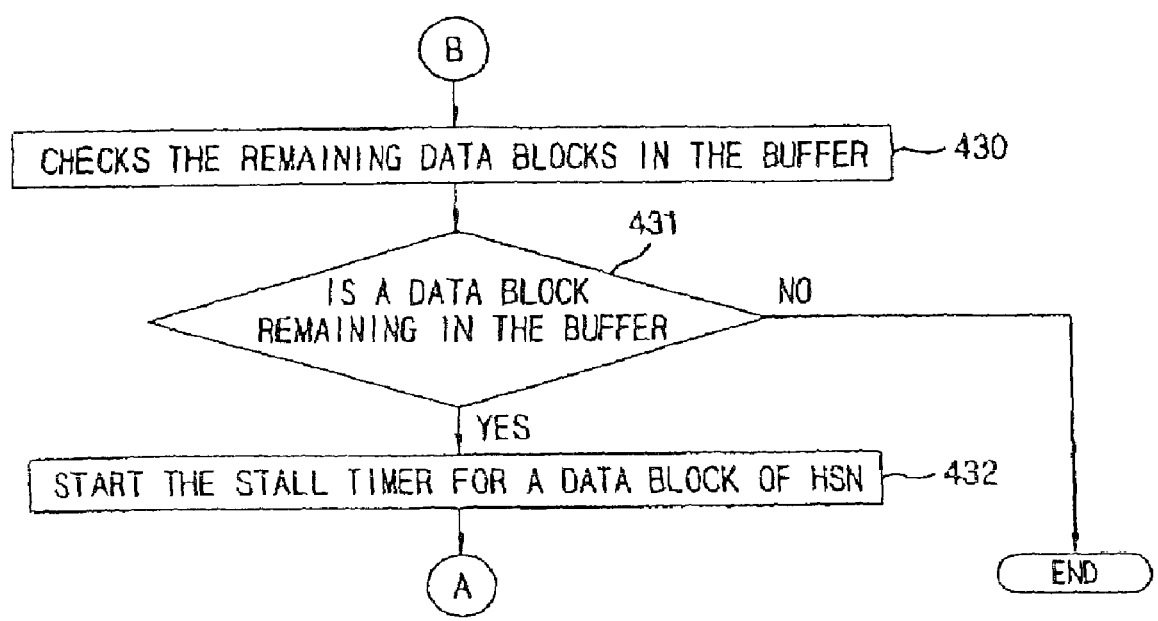

FIGS. 8A-8C show steps included in a method for avoiding a stall condition in a reordering buffer of a protocol layer of a receiver in accordance with one embodiment of the present invention. Referring to FIG. 8A, the method includes as an initial step receiving a data block with a sequence number SN from a peer entity of the transmitter via lower layers such as a physical layer through an HS-DSCH channel. (Block 400).

A second step includes determining whether or not the received data block can be delivered to the upper layer. (Block 401). This step is performed based on whether one or more previous data blocks was not received. If at least one data block having a transmission sequence number that precedes the transmission sequence number of the received data block has not been received, the received data block (with a transmission sequence number of TSN) is not delivered to the upper layer but stored in the reordering buffer. (Block 402). The missing data block(s) may be detected, for example, by comparing the transmission sequence number in the header of the newly received data block with the transmission sequence number of a last-delivered data block. If these numbers are not sequential, then a missing data block may be determined to exist and the number of missing blocks may be determined based on the difference between these numbers. These functions may be performed under control of the MAC controller in conjunction with, for example, the reordering queue distribution and HARQ units.

Under these circumstances, even though data block TSN was correctly received, it may not be immediately delivered to an upper layer because data block TSN−1 is missing. (Those skilled in the art can appreciate that the foregoing example is not to be limiting of the present invention, as there may be more than one missing data block between the last-delivered data block and data block SN.) When this occurs, data block SN is temporarily stored in the reordering buffer. If all data blocks having preceding transmission sequence numbers have been delivered within the time frame under consideration, then data block SN is not stored in the buffer but rather is automatically delivered to the upper layer. (Block 403).

A next step includes determining whether a stall timer provided for the buffer is active. (Block 404). If the timer is active, then no additional timer is started since only one timer is provided for each reordering buffer. This step may be restated as follows:

If a timer T1 is already active:
no additional timer shall be started, i.e., only one timer T1 may be active at a given time.

If the stall timer is not active, the timer is started and runs for a predetermined period, which may be determined by the MAC controller and/or one or more upper layers of the protocol (Block 405). These steps may be restated as follows:

If no timer T1 is active:
the timer T1 shall be started when a MAC-hs PDU with TSN=SN is correctly received but cannot be delivered to the disassembly function because the MAC-hs PDU with TSN equal to Next_expected_TSN is missing.

Here, the term "next-expected-TSN" means a TSN of a data block which should be received next time if the data blocks are received in sequence.

Referring to FIG. 8B, the conditions for stopping the stall timer and actions after the stop and expiration of the stall timer will be explained. Once a stall timer is started, it is determined whether data block TSN for which the stall timer was started is delivered to the upper layer before expiration of the timer period. (Block 411). If the data block for which the stall timer was started is delivered to the upper layer before this time, the stall timer is stopped (Block 420). These steps may be restated as follows:

The timer T1 shall be stopped if:
the MAC-hs PDU for which the timer was started can be delivered to the disassembly function before the timer expires.

If the data block has not been delivered to the upper layer during the period of the stall timer, the following steps may be performed. First, all data blocks that are received during the period of the stall timer are placed in the reordering buffer preferably in sequence if the received data block cannot be delivered to the upper layer. (Block 410). Thus, for example, in case that the stall timer is started for the data block SN with the data blocks from SN−4 to SN−1 are missing, and if data blocks SN−4, SN−2, and SN−1 are received during the period of the stall timer, the data block SN−4 is immediately delivered to the upper layer, and the data blocks SN−2 and SN−1 are stored in the reordering buffer.

When the stall timer period expires, the data blocks stored in the reordering buffer up to the data block of SN for which the stall timer was started will be treated appropriately. (Block 413). Among the data blocks stored up to data block SN, all correctly received but not delivered data blocks are sequentially delivered to an upper layer. These data blocks may then be removed from the buffer to make room for subsequently received data blocks. These steps may be restated as follows:

When the timer T1 expires:
all correctly received MAC-hs PDUs up to and including SN−1 shall be delivered to the disassembly function and be removed from the reordering buffer.

Of course, it is understood in this re-stated language that data block SN is also delivered at this time after all the preceding data blocks are delivered.

The method of the present invention may perform the following additional steps as a way of further improving transmission efficiency. During the stall timer period, data blocks having transmission sequence numbers greater than data block SN (e.g., data blocks SN+1, SN+2, etc.) may be received, in addition to the preceding data blocks (e.g., data blocks SN−1, SN−2, etc.). Because at least one preceding data block has not been delivered, these succeeding data blocks may not be delivered. Instead, they are stored in the reordering buffer in sequence with data block of SN.

When the stall timer period expires, the method of the present invention may advantageously deliver all data blocks stored in the reordering buffer that have transmission sequence numbers that consecutively follow data block SN. (Block 414).

It is possible that one or more succeeding data blocks may not be received during the stall timer period. For example, data blocks SN+1, SN+2, and SN+4 may have been received but data block SN+3 may not be received. In this case, the method of the present invention may deliver all succeeding data blocks stored in the reordering buffer up to the first missing data block SN+3. Thus, data blocks SN+1 and SN+2 may be delivered at the time the stall timer expires, but data block SN+4 may be left in the reordering buffer. After delivering data blocks SN+1 and SN+2, the next-expected-TSN becomes SN+3. Delivering these succeeding data blocks further improves transmission efficiency and therefore is highly desirable. These steps of the invention may be re-stated as follows:

When the timer T1 expires:
all correctly received MAC-hs PDUs up to the first missing MAC-hs PDU shall be delivered to the disassembly function.

When one or more succeeding data blocks are missing in the reordering buffer at a time when the stall timer expires or when the stall timer is stopped because data block SN is delivered prior to timer expiration, the method of the present invention may follow a control procedure, which may represent another embodiment of the invention.

The control procedure, shown in FIG. 8C, includes re-starting the timer based on the data block of highest transmission sequence number (hereinafter referred to as HSN) that is the last number of the cyclic order of the sequence numbers of the data blocks stored in the reordering buffer at the time the stall timer expired or was stopped. (Blocks 412, 420). This step may therefore be re-stated as follows:

When the timer T1 is stopped or expires, and there still exist some received MAC-hs PDUs that cannot be delivered to the higher layer:
timer T1 is started for the MAC-hs PDU with highest TSN among those MAC-hs PDUs that cannot be delivered.

In the above step, it is noted that there may only be a finite number of transmission sequence numbers that can be assigned to data blocks. In this case, transmission sequence numbers must therefore be reused. It is therefore possible under these circumstances that the last data block stored in the reordering buffer is not in fact the one having the highest transmission sequence number. Therefore, the highest transmission sequence number (HSN) is the last number of the cyclic order of the sequence numbers of the data blocks stored in the reordering buffer, instead of the largest transmission sequence number.

The data block of HSN or the data block in the buffer having the highest transmission sequence number may correspond to the last data block of a part of a circulation of the transmission sequence number.

The behavior of the reordering buffer for the re-started stall timer is the same for the previous stall timer. During the re-started timer period, all data blocks preceding data block HSN may be received and delivered to the upper layer. If so, the data block HSN is delivered to the upper layer (Block 411) and the stall timer is stopped (Block 420).

If at least one data block preceding data block HSN is not received before the restarted stall timer period expires, the data block HSN and other received but not delivered data blocks are stored in the reordering buffer in proper sequence. When the re-started timer period expires (Block 412), among the data blocks up to the data block HSN all correctly received but undelivered data blocks are sequentially delivered to the upper layer. (Block 413). Among the data blocks succeeding data block HSN, all in-sequence data blocks are also delivered to the upper layer. The delivered data blocks are then discarded from the buffer. (Block 413). After delivering all possible data blocks, if one or more data blocks still remain in the reordering buffer, the stall timer restarts for the data block of new HSN, and the control procedure begins again. If no data blocks are left in the buffer, the stall timer becomes inactive and the reordering buffer waits for the next data block, i.e., the whose procedure begins again.

Figure 9:
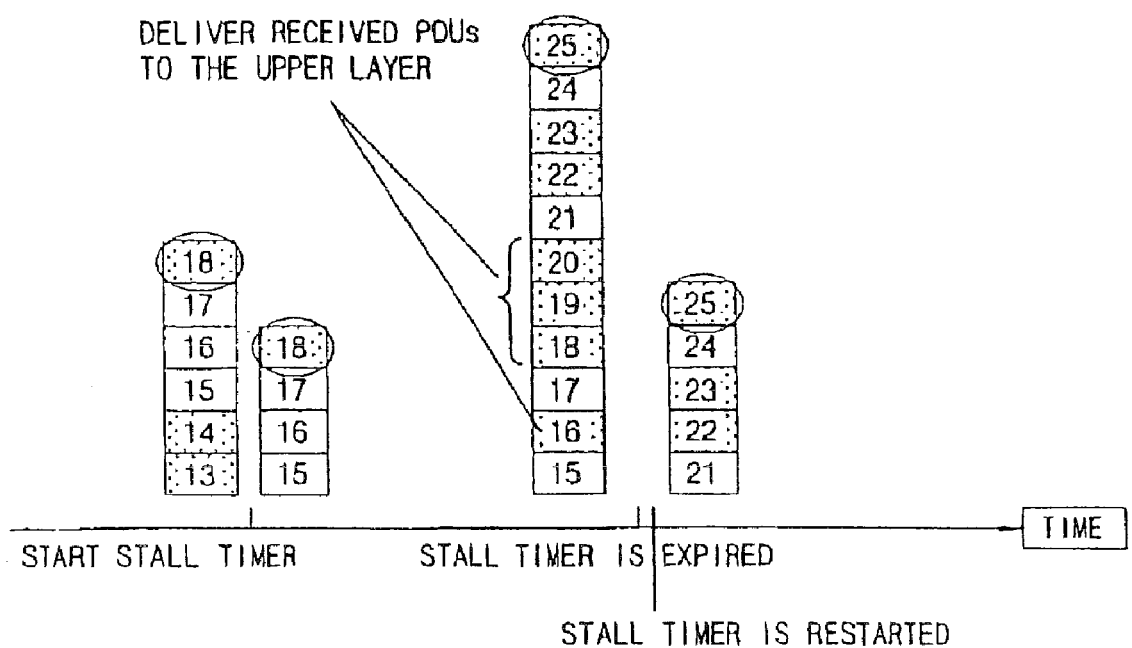
FIG. 9 shows a timing diagram illustrating a first control procedure in accordance with the present invention.

FIG. 9 shows a timing diagram for an exemplary control procedure that may be performed in accordance with the present invention. This diagram shows that before the stall timer is started for the first time, data blocks SN 13 and SN 14 are received and delivered to the upper layer. Because all previous data blocks have been delivered, data blocks SN 13 and SN 14 are also delivered without delay to an upper layer. At this time, the next-expected-TSN is SN 15. The next data block received after data block SN 14 is SN 18. Since the data blocks SN 15, SN 16, and SN 17 are not received yet, the received data block SN 18 cannot be delivered to the upper layer. Under these conditions, data block SN 18 is stored in the reordering buffer and the stall timer is started.

When the stall timer is first started, the reordering buffer may only contain data block SN 18. At the end of the first timer period, data block SN 16 is received along with succeeding data blocks SN 19, SN 20, SN 22, SN 23, and SN 25. Data blocks SN 21 and SN 24, however, are missing along with SN 15 and SN 17. At this time, data blocks SN 16, SN 18, SN 19, and SN 20 are delivered to the upper layer and are also discarded from the reordering buffer. Data blocks SN 22, SN 23, and SN 25 are not delivered at this time because one of the preceding data block SN 21 is missing. Therefore, the stall timer is re-started for a second time based on data block SN 25. All received data blocks up to and including data block SN 25 will be delivered at the end of the second timer period, even if data blocks SN 21 and SN 24 are not received by this time. Among the stored data blocks succeeding data block 25, all in-sequence data blocks are also delivered to the upper layer at this time. The delivered data blocks in the buffer are then discarded and the method begins again depending on whether there is any data block left in the reordering buffer.

Figure 10A:
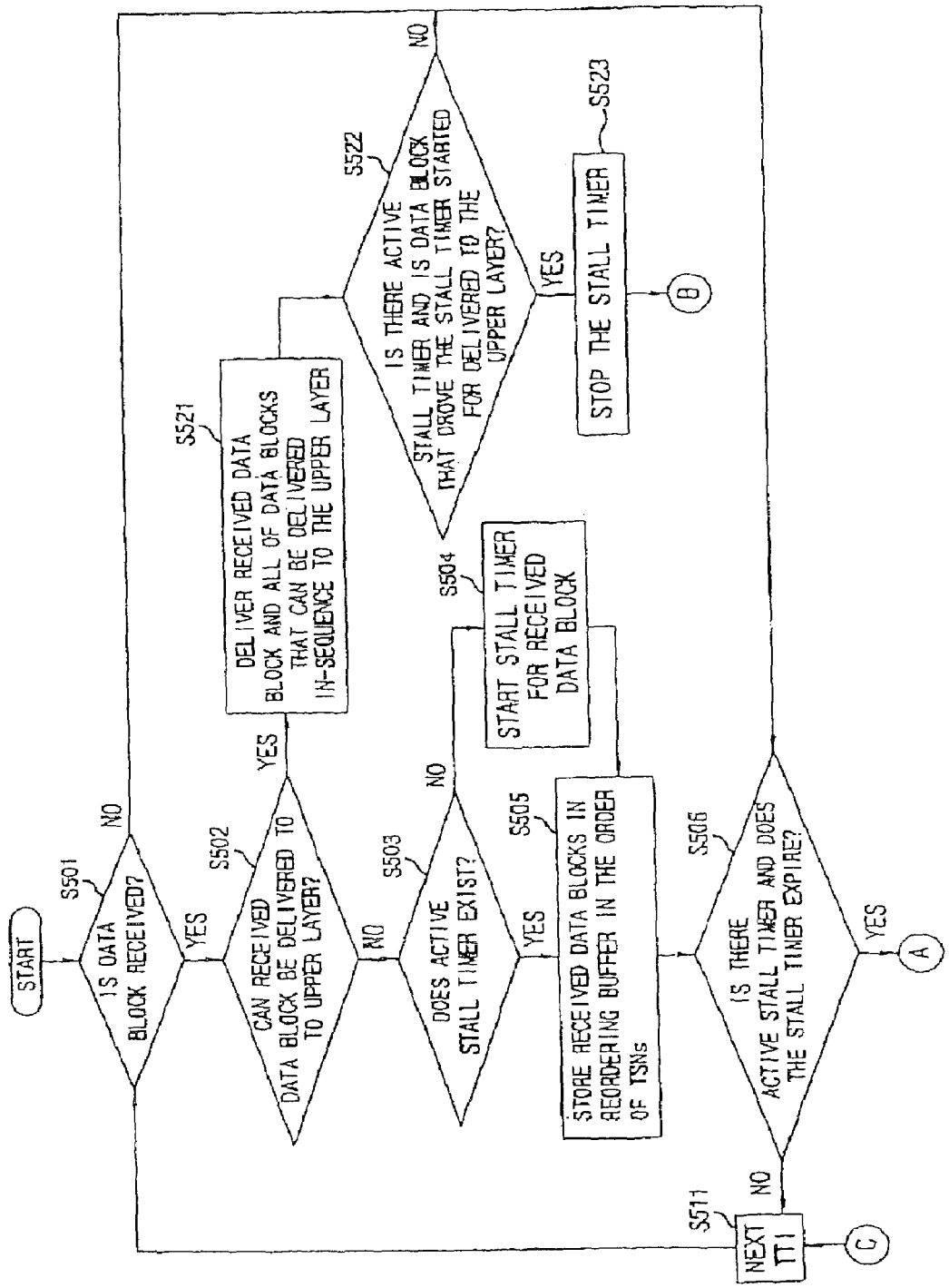

FIGS. 10A and 10B show another embodiment of the method of the present invention for avoiding a stall condition in an HSDPA system. Now, the term "data block DB" is defined as the data block for which the stall timer is started and "data block M" as the data block that is received during the stall timer period. As shown in FIG. 10A, this method includes as an initial step determining whether a data block DB has been received from the physical layer in a medium access control layer of the user equipment (Block 501). The data block may be received through an HS-DSCH channel connected to one of a plurality of HARQ processes included in the MAC layer. In terms of content, the data block preferably includes header information and one or more MAC-hs SDUs (or MAC-d PDUs). The HARQ processes may deliver data blocks to a reordering buffer in the MAC layer based on priority level information included in the data block headers.

When data block DB is received, a next step of the method includes determining whether the received data block DB may be delivered to an upper layer, such as a radio link control layer (Block 502). This step may be performed based on the following rule: a data block received by the MAC layer cannot be delivered to an upper layer unless and until all immediately preceding data blocks have been delivered. If one or more immediately preceding data blocks have not been received by the MAC layer (i.e., are missing from an input data stream), the data block DB is not delivered to the upper layer upon receipt. Instead, a check is performed to determine whether a stall timer assigned to control a reordering buffer is active. (Block 503).

Data blocks may be determined to be missing based on a comparison of the transmission sequence number of the received data block DB and, for example, a transmission sequence number of a last-delivered data block. If the two sequence numbers are not in succession, then the difference between the sequence numbers may be used as a basis for determining how many missing data blocks exist (i.e., were not received) before the received data block DB.

If the stall timer is determined to be inactive, the stall timer is activated (Block 504) and the received data block is stored in the reordering buffer (Block 505). The subsequently received data blocks are either delivered to the upper layer or stored in the reordering buffer depending on their transmission sequence numbers TSNs. If the TSN of the received data block M consecutively follows the TSN of the last-delivered data block, i.e., if the received data block M is the data block of the Next-expected-TSN, then the received data block M is delivered to the upper layer without being stored in the reordering buffer. But if the TSN of the received data block M does not consecutively follow the TSN of the last-delivered data block, i.e., if there are one or more missing data blocks preceding the received data block M, then the received data block M is stored in the reordering buffer based on its transmission sequence number TSN. The data block M stored in the reordering buffer is delivered to the upper layer only after all the preceding data blocks are received and delivered to the upper layer or, if the data block M has not been delivered to the upper layer until the stall timer expires, after the stall timer expires. The manner in which the count period of the stall timer is set is discussed in greater detail below. At this time, it is sufficient to understand that the count period is preferably set to a value which ensures that a wrap-around condition does not occur.

An example of the foregoing may be given as follows. In this example, the following events occur one by one. Each step occurs for each TTI (Transmission Time Interval=2 ms). Assume that before this procedure the NET (Next-expected-TSN)=9.

1. Data block 9 is received→delivered to the upper layer, NET=10.
2. Data block 15 is received→stored in the reordering buffer and the stall timer starts
3. Data block 20 is received→stored in the reordering buffer.
4. Data block 10 is received→delivered to the upper layer, NET=11.
5. Data block 14 is received→stored in the reordering buffer
6. Data block 16 is received→stored in the reordering buffer
7. Data block 18 is received→stored in the reordering buffer
8. Data block 12 is received→stored in the reordering buffer
9. Data block 11 is received→data blocks 11 and 12 are delivered to the upper layer, NET=13
10. Stall timer expires.
    i. Data blocks 14, 15, and 16 are delivered to the upper layer, NET=17
    ii. Stall timer re-starts for the data block 20. (At the time the stall timer re-starts, data blocks 18 and 20 are still left in the reordering buffer and data blocks 17 and 19 have not yet been received).

If the stall timer is determined to already be active, this means that a stall timer condition has arisen with respect to a data block which has been previously received and stored in the reordering buffer. That is, the currently received data block is the data block M in the above example, and the stall timer is already started for the previously received data block DB. In this situation, the received and the subsequently received data blocks are either delivered to the upper layer or stored in the reordering buffer depending on their transmission sequence numbers TSNs. The received and the subsequently received data blocks are preferably stored based on their transmission sequence numbers TSNs. The stored data blocks are delivered to the upper layer only after all the preceding data blocks are received and delivered to the upper layer or after the stall timer period expires.

During the period when the timer is active, data blocks may continue to be received and stored in the reordering buffer. These data blocks may include the missing data blocks that were determined to precede data block DB as well as successively received data blocks, i.e., ones having transmission sequence numbers greater than the transmission sequence number of data block DB. The situation may arise, however, that only some or even none of the preceding data blocks are received during this time. Also, one or more of the successive data blocks may not be received. (This may be determined based on a comparison of transmission sequence numbers of the subsequently received data blocks.)

In a next step, it is determined whether the stall timer has expired (Block 506). When the stall timer expires, among the data blocks preceding the data block DB, all data blocks which have been received prior to timer expiration but not delivered to the upper layer are delivered to the upper layer with data block DB. In accordance with the present invention, this is advantageously performed even when all preceding data blocks were not received prior to timer expiration. Under these circumstances, as shown in FIG. 10B, the MAC layer (and preferably the MAC-hs sub-layer) transmits information to the transmitter (e.g., the UTRAN) identifying which preceding data blocks were not received within the timer period (Block 507). The transmitter may, in response, cease all efforts to re-transmit the missing data blocks.

In a next step, the successively received data blocks stored in the reordering buffer are examined to determine whether they can also be delivered with data block DB (Block 508). This involves comparing the transmission sequence numbers of the remaining data blocks stored in the reordering buffer with the transmission sequence number of data block DB. All remaining data blocks stored in the reordering buffer which have transmission sequence numbers that consecutively follow the transmission sequence number of data block DB are preferably delivered to the upper layer. The cut-off point for delivery of these successive data blocks may be a missing data block.

To illustrate the foregoing step, if data block DB has a transmission sequence number equal to 10 and data blocks having transmission sequence numbers equal to 11, 12, and 14 are stored in the reordering buffer, then data blocks 11 and 12 are delivered to the upper layer preferably after delivery of data block 10. Because the data block having transmission sequence number 13 is missing (i.e., was not yet received), data block 14 and all data blocks stored thereafter are not delivered but left in the reordering buffer. For efficiency purposes, all data blocks which have been delivered may be deleted from the buffer.

It is possible that all remaining data blocks stored in the reordering buffer have consecutively successive transmission sequence numbers. In this case, all remaining data blocks in the reordering buffer are delivered to the upper layer with data block DB upon timer expiration, and the stall timer becomes inactive. On the other hand, if there is any data block remaining in the reordering buffer due to one or more missing data blocks, the stall timer is re-started for the data block with the highest transmission sequence number among the remaining data blocks in the reordering buffer. This will be further described in a next step.

When the stall timer expires, after all the possible data blocks are delivered to the upper layer, a check is performed to determine whether any data blocks are left in the reordering buffer (Block 509). If not, the method returns to Block 501 for a next TTI without re-starting the timer, i.e., the stall timer becomes inactive. If any data blocks are left in the reordering buffer, the stall timer is re-started for purposes of delivering all remaining data blocks stored in the reordering buffer (Block 510). More specifically, the stall timer is re-started for the data block of HSN in the reordering buffer, which may correspond to the one having the highest transmission sequence number.

During the period of the re-started timer, some preceding and successive data blocks may be received like in the previous stall timer period. The received data blocks are either delivered to the upper layer or stored in the reordering buffer depending on their transmission sequence numbers TSNs. When the re-started timer expires, the same procedure is performed as in the case when the previous stall timer period expires. That is, all stored preceding data blocks and the data block for which the stall timer re-started (e.g., the one having the highest transmission sequence number at the time when the previous stall time expires) are delivered to the upper layer. Among the stored successive data blocks, the data blocks up to the first missing data block are also delivered to the upper layer. After these data blocks are delivered, they are preferably discarded from the reordering buffer.

Delivery of the data blocks to an upper layer such as an RLC layer may involve a step of disassembling the blocks into MAC-d PDUs. The disassembled blocks may then be delivered to the MAC-d sub-layer through the MAC-c/sh layer before reaching the RLC layer.

Additional steps of the method address the situation where a received data block can be delivered to an upper layer. This occurs, for example, when immediately preceding data blocks have been received and delivered to the upper layer. When this situation arises, the received data block is not stored in the reordering buffer. Instead, it is immediately delivered to the upper layer along with all received data blocks having successive transmission sequence numbers. (Block 521).

After delivering all possible data blocks to the upper layer, a check is performed to determine whether data block DB (which started the stall timer) has been delivered to an upper layer (Block 522). If so, the stall timer may be stopped and re-set for later use (Block 523). If the conditions in Block 522 are not met, then the method continues to wait until the stall timer expires, whereupon the options stemming from step S106 are performed as previously discussed.

The stall timer may be controlled by one or more upper layers of the protocol such as an upper radio resource control (RRC) layer. This layer preferably sets the timer to a period that will ensure that wrap-around in the reordering buffer will not occur. This condition occurs when the period of the stall timer is set too long, so that different data blocks having the same or redundant transmission sequence numbers are stored in the buffer.

Whether or not a wrap-around condition will occur depends on the range of possible transmission numbers that can be assigned to data blocks within the user equipment. For example, if a maximum of 64 transmission sequence numbers (0 to 63) can be assigned, then the 1st and 65th data blocks transmitted from the UTRAN will be redundantly assigned a transmission serial number of 0. If stall timer period is set to allow these data blocks to be stored in the reordering buffer at the same time, then a wrap-around condition will occur.

The present invention may advantageously set the period of the stall timer to ensure that this wrap-around condition does not occur. This may be accomplished by having the RRC determine the maximum value of the transmission sequence numbers that can be set and then determining the duration of one TTI. Since the maximum delay is less than 2×T1, the wrap-around condition may be avoided by setting the maximum stall timer period T1 to a proper value. In accordance with embodiment of the present invention, when transmission sequence numbers lie within a range of 0 and 63 and one TTI is 2 ms, the RRC may set the period of the stall timer so that it does not exceed 64 ms (=2 ms 64/2). This may be understood as follows.

Figure 11A:
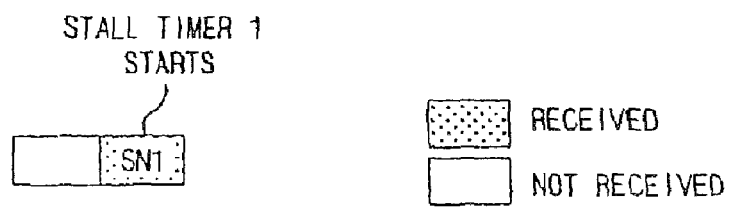
FIGS. 11A-11C illustrate how the maximum value of a stall timer period T1 may be calculated for a worst case scenario.
Figure 11B:
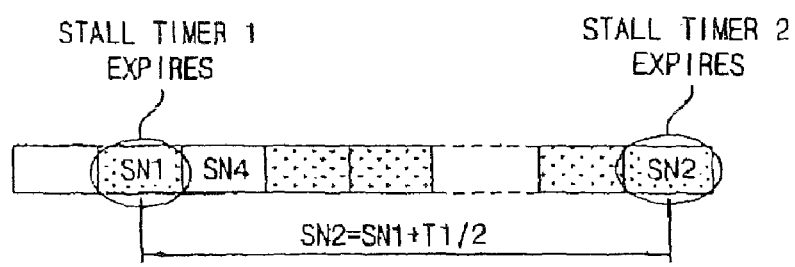
Figure 11C:
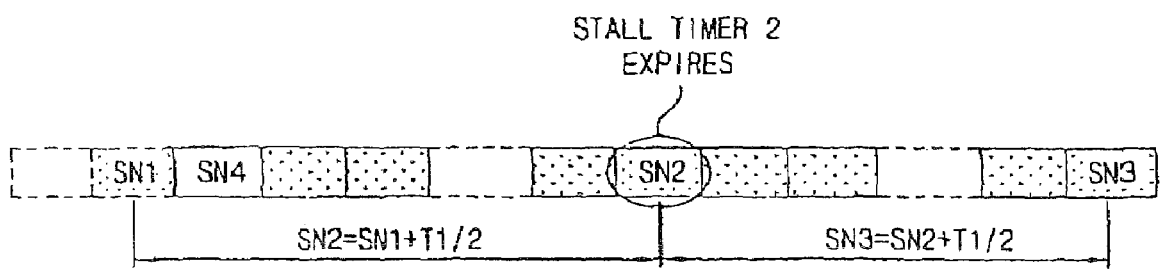

FIGS. 11A-11C illustrate how the maximum value of the stall timer period T1 may be calculated for a worst case scenario. FIG. 11A shows that a data block whose transmission sequence number is SN1 is received but that an immediately preceding data block was not. As previously discussed, when this occurs the stall timer may be started for data block SN1.

FIG. 11B shows that while the stall timer is running, all successive data blocks having transmission sequence numbers except data block SN4 are received. Here, it may be assumed that data block SN4 will never be received, for example, because the UTRAN mis-interpreted a non-acknowledgment signal (NACK) transmitted from the user equipment requesting re-transmission of a data block as an acknowledgment signal or because the UTRAN mistakenly deleted the data block and therefore cannot re-transmit it to the user equipment.

When the stall timer expires, data block SN1 is delivered to the higher layer, but the other received data blocks up to and including data block SN2 cannot be delivered because of missing data block SN4. Instead, these blocks are maintained in the buffer and the stall timer is re-started (or alternatively, a second stall timer 2 is started) for the data block of HSN, which in this case is data block SN2. Theoretically, the highest value of transmission sequence number SN2=SN1+T1/(2 ms).

FIG. 11C shows that during the second period of the stall timer, all successive data blocks are correctly received. At the expiration of the second timer period, the last data block received and stored in the reordering buffer is data block SN3. Theoretically, the maximum value of transmission sequence number SN3=SN2+T1/(2 ms)=SN1+T1. Therefore, the range of the data blocks that can be received by the receiver during the second stall timer period is [SN4, SN3]=[SN+1, SN1+T1].

As mentioned, the range of transmission sequence numbers which can be assigned to data blocks is 0 to 63. Therefore, when the transmission sequence number SN3 is equal to or larger than the transmission sequence number SN4+64, the user equipment receiver cannot determine whether subsequently received data blocks are before or after data block SN2 shown in the figure. This wrap-around condition occurs because there are only a limited number of transmission sequence numbers that can be assigned to the data blocks.

To prevent a wrap-around condition from occurring, the Inventors of the present invention have determined that the transmission sequence number SN3 should be less than or equal to SN4+64. The maximum value of SN3 may be expressed as SN3=SN4+64−1=SN1+64. That is because SN3=SN1+T1, the maximum value of T1 must theoretically be 64 ms. Thus, if the stall timer period T1 is set to a value of less than or equal to 64 ms, the TSN wrap-around condition will not occur. The RRC of the present invention may control the stall timer in accordance with these criteria with respect to the manner in which operation of the reordering buffer is managed.

In general, when the range of transmission sequence numbers to be assigned to data blocks is N numbers and the TTI is 2 ms, the maximum value of the period of the stall timer must be N×TTI/2. When the period of the stall timer is larger than 64 ms, in the worst case a new data block having a same or redundant transmission sequence number as that of a data block previously stored in the reordering buffer can be received before the stall timer expires. However, in this case, one of the two data blocks and preferably the redundantly numbered data block is discarded. Therefore, in order to prevent transmission sequence number wrap-around when the range of TSN numbers is 64 and the TTI is 2 ms, the maximum period of the stall timer should be no greater than 64 ms.

In operation, it is preferable for the UTRAN not to transmit (or re-transmit) a data block that was not received within the time period of 2×T1. This is because the maximum reception standby time the receiver can wait for a data block is 2×T1 without violating the wrap-around condition. Data blocks re-transmitted after this time are preferably discarded in the user equipment even if correctly received. Therefore, a discard timer is preferably provided for each HARQ process in the UTRAN, and the period of the discard timer is preferably set to no more than twice the stall timer period in the user equipment receiver.

Figures 12A, 12B:
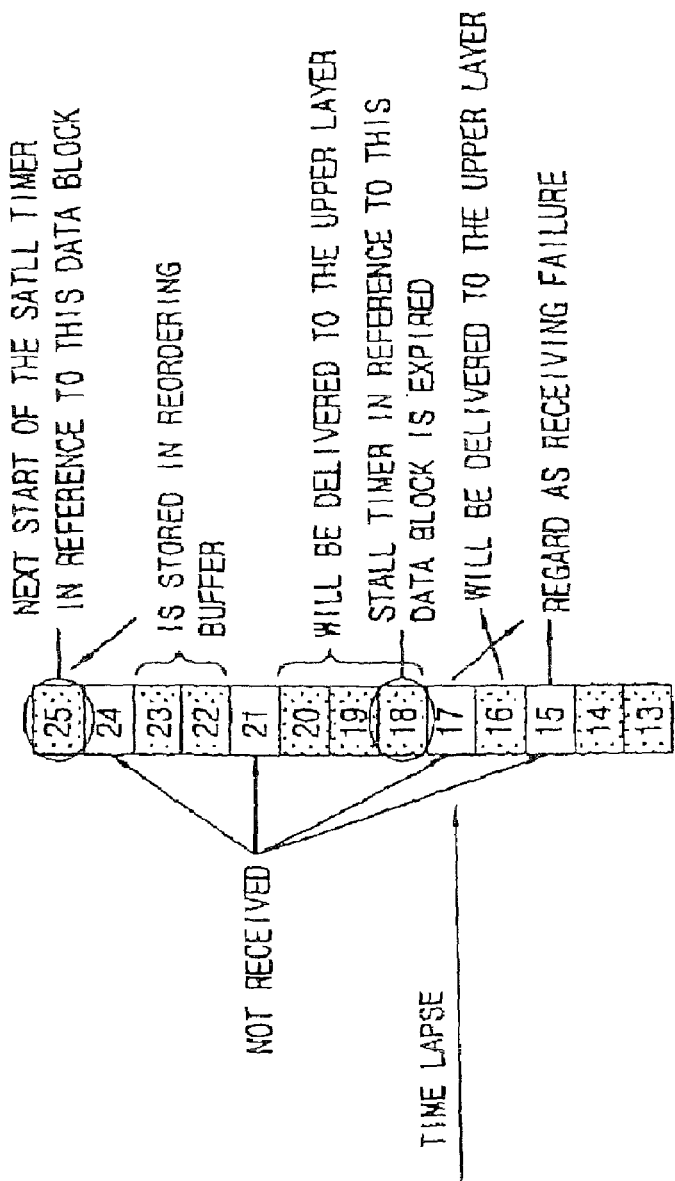
FIGS. 12A and 12B show an example of how the method of the present invention may operate a stall timer for managing the storage of data blocks in a reordering buffer in a way that avoids a stall condition.

FIGS. 12A and 12B show an example of how the method of the present invention may operate a stall timer for managing the storage of data blocks in a reordering buffer in a way that avoids a stall condition.

Initially, the medium access control (MAC) layer in, for example, a mobile terminal receiver sequentially receives data blocks having transmission sequence numbers 13 and 14 respectively. Because immediately preceding data block were delivered to the upper layer, data blocks 13 and 14 are not stored in the reordering buffer but rather are also delivered to the upper layer. However, when the data block having a transmission sequence number of 18 is received, it is detected that preceding data blocks 15, 16, and 17 were not received. Consequently, data block 18 is stored in the reordering buffer and the stall timer is started. At the time the stall timer is started, it is noted that only data block 18 is stored in the reordering buffer. This situation is reflected in FIG. 12A.

During the period of the stall timer, the MAC layer monitors which data blocks are received. As shown in FIG. 12B, data block 16 is received during this time along with data blocks 18, 19, 20, 22, 23, and 25. Data blocks 21 and 24 were detected as not being received.

When the stall timer period expires, in accordance with the present invention data block 16 is delivered with data block 18. Also, because data blocks 19 and 20 sequentially follow block 18 in terms of transmission sequence numbers (i.e., because no missing data block exists between block 18 and blocks 19 and 20), data blocks 19 and 20 are delivered to the upper layer without further delay. All delivered data blocks may be deleted from the reordering buffer, for example, to make room for storing subsequently received data blocks. Also, the MAC layer of the user equipment may transmit a message instructing the UTRAN not to re-transmit data blocks 15 and 17 if these blocks were not received prior to expiration of the timer period.

Data blocks 22, 23, and 25 are not delivered when the stall timer expires because data block 21 was not received. Instead, the data block of HSN stored in the reordering buffer at the time the stall timer expired is detected.

Figure 13:
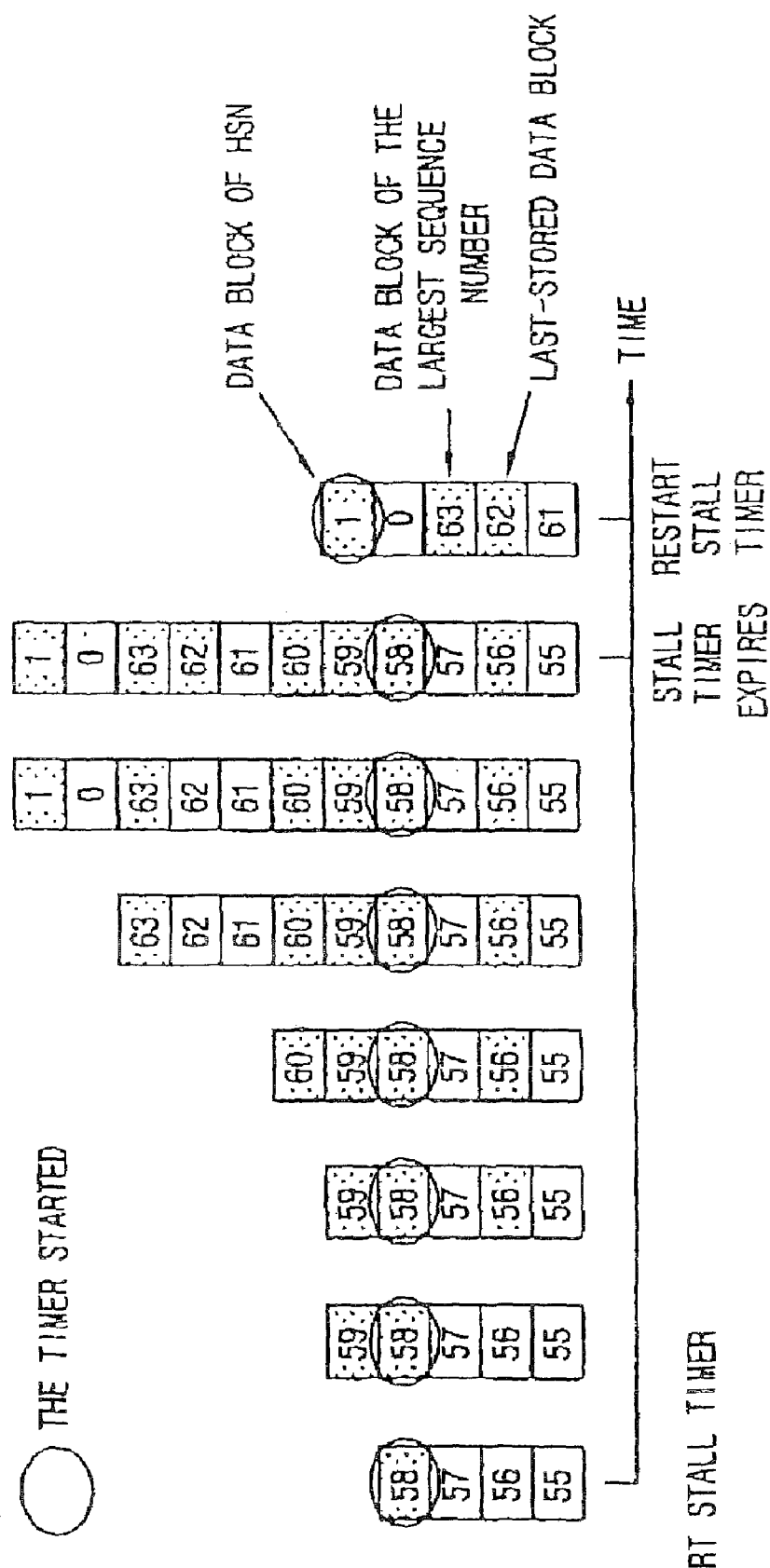
FIG. 13 shows an example of how the method of the present invention is applied to a situation where the sequence numbers of data blocks stored in a reordering buffer begin to be reused.

In this case, the data block of HSN 25 corresponds to the one having the highest transmission number in the reordering buffer. This may not always be the case however. Since there is only a finite range of transmission sequence number that can be assigned to data blocks, it may be the case that a succession of data blocks 63, 0, 1, and 2 are stored in the reordering buffer. In this case, the data block of HSN would not correspond to the data block having the largest transmission sequence number. This case is illustratively shown in FIG. 13. The present invention is therefore preferably performed to re-start the stall timer to coincide with the data block of HSN in the buffer and not necessarily the data block having the highest transmission sequence number.

After the data block of HSN in the buffer is detected, the stall timer is re-started. During this time, additional data blocks are received, some of which may include missing data blocks 21 and 24. When data block 21 is received during the stall timer period, the data blocks 21, 22, and 23 are sequentially delivered to the upper layer. And then, if data block 24 is also received during the stall timer period, the data blocks 24, 25, and the consecutively successive data blocks are delivered to the upper layer and the stall timer stops. But, if data blocks 21 and 24 are not received during the stall timer period, the data blocks 22, 23, and 25 and the consecutively successive data blocks are delivered to the upper layer only after the stall timer expires. The delivered blocks are then discarded from the buffer and the process continues.

Concerning this embodiment of the invention, preferably a reordering buffer may be controlled by only one stall timer.

Another embodiment of the method of the present invention for preventing a stall condition may be performed in user equipment containing the same MAC layer structure as in the first embodiment. The manner in which the reordering buffer is controlled, however, is different.

In connection with this embodiment, the following definitions may apply. The term "Next_expected_TSN" corresponds to a transmission sequence number which follows the transmission sequence number of the last in-sequence MAC-hs protocol data unit (PDU) received. It shall be updated upon receipt of the MAC-hs PDU with a transmission sequence number equal to Next_expected_TSN. An initial value of Next_expected_TSN=0.

In this embodiment, a stall timer controls a reordering buffer in the MAC layer, and more specifically the MAC-hs sub-layer, of the user terminal. The stall timer period may be controlled by upper layers to avoid the wrap-around condition previously discussed.

Initially, it is noted that the stall timer T1 is inactive. The stall timer is started when a MAC-hs PDU with TSN=SN is correctly received by the user terminal, but cannot be delivered to a corresponding disassembly function because the MAC-hs PDU with TSN equal to Next_expected_TSN is missing. While the stall timer is already active, no additional stall timers or timer periods may be started, i.e., only one timer T1 may be active at any given time.

The stall timer T1 will be stopped if the MAC-hs PDU for which the timer was started can be delivered to the disassembly function before the stall timer T1 expires.

When the stall timer T1 expires, all correctly received MAC-hs PDUs up to and including SN−1 are delivered to the disassembly function. The delivered MAC-hs PDUs are then removed from the reordering buffer. Also, all correctly received MAC-hs PDUs up to the first missing MAC-hs PDU following, for example, MAC-hs PDU of SN, are delivered to the disassembly function.

When the timer T1 is stopped or expires and there still exists some received MAC-hs PDUs that cannot be delivered to an upper layer, the stall timer T1 is re-started for the MAS-hs PDU with the highest transmission sequence number among those MAC-hs PDUs that cannot be delivered.

All received MAC-has PDUs having consecutive transmission sequence numbers (TSNs) from Next_expected_TSN up to the first not received MAC-has PDU are delivered to the disassembly entity. The TSN of the first not received MAC-hs PDU becomes the Next_expected_TSN.

The present invention is also a computer program having respective code sections which perform steps included in any of the embodiments of the method of the present invention discussed herein. The computer program may be written in any computer language supportable within a user terminal, and may be stored on a permanent or removable computer-readable medium within or interfaced to the terminal. Permanent computer-readable mediums include but are not limited to read-only memories and random-access memories. Removable mediums include but are not limited to EPROMs, EEPROMs, any one of a number of so-called memory sticks or cards, or any other type of removable storage medium. Flash memories may also be used to store the computer program of the invention.

It is noted that the present invention has been adopted in 3GPP Technical Specification TS 25.308 covering UTRA High Speed Downlink Packet Access (HSDPA)-Overall Description, and 3GPP Technical Specification TS 25.321 covering the MAC Protocol Specification. These documents are incorporated herein by reference.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling a stall avoidance of a receiving communication device using a timer, the timer controlling the stall avoidance, the method comprising:
    if the timer is not active, starting the timer by the receiving communication device when a medium access control—high speed (MAC-hs) protocol data unit (PDU) with a transmission sequence number (TSN) higher than next expected TSN is correctly received;
    one of (1) stopping the timer by the receiving communication device if the MAC-hs PDU with the TSN for which the timer was started can be delivered to a higher entity before the timer expires, and (2) when the timer expires, delivering all correctly received MAC-hs PDUs up to and including a MAC-hs PDU having a TSN-1 to the higher entity and delivering all correctly received MAC-hs PDUs up to a next not received MAC-hs PDU to the higher entity; and
    when the timer is stopped or expires, and there exists some received MAC-hs PDUs that cannot be delivered to the higher entity, the timer is started for a highest TSN among those of the MAC-hs PDUs that cannot be delivered to the higher entity.

2. The method of claim 1, wherein the higher entity is a higher layer.

3. The method of claim 2, wherein the higher layer is a MAC-d sub-layer.

4. The method of claim 2, wherein the higher layer is a radio link control layer.

5. The method of claim 1, wherein the steps are implemented in a mobile terminal.

6. The method of claim 1, wherein the steps are implemented in a Node B.

7. The method of claim 1, wherein the higher entity is a disassembly unit.

8. The method of claim 1, wherein a period of the timer is less than or equal to $N*(TTI/2)$, wherein N is the range of sequence numbers to be assigned to the MAC-hs PDUs, and TTI is the transmission time interval.

9. The method of claim 1, wherein the steps are performed by a MAC-hs entity of a MAC layer of the receiving communication device.

10. The method of claim 1, wherein the MAC-hs PDUs are delivered to the higher entity in sequence.

* * * * *